US012123096B1

(12) United States Patent
Young

(10) Patent No.: US 12,123,096 B1
(45) Date of Patent: Oct. 22, 2024

(54) LEADING-EDGE STRUCTURES FOR AIRFOILS AND SYSTEMS AND METHODS FOR FABRICATING THE SAME

(71) Applicant: The Boeing Company, Arlington, VA (US)

(72) Inventor: Kenneth W. Young, Bear, DE (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/322,801

(22) Filed: May 24, 2023

(51) Int. Cl.
| | |
|---|---|
| *F01D 5/28* | (2006.01) |
| *C23C 24/04* | (2006.01) |
| *B33Y 10/00* | (2015.01) |
| *B33Y 70/00* | (2020.01) |
| *B33Y 80/00* | (2015.01) |

(52) U.S. Cl.
CPC .............. *C23C 24/04* (2013.01); *F01D 5/288* (2013.01); *B33Y 10/00* (2014.12); *B33Y 70/00* (2014.12); *B33Y 80/00* (2014.12); *F05D 2230/31* (2013.01); *F05D 2230/90* (2013.01); *F05D 2240/303* (2013.01); *F05D 2300/13* (2013.01); *F05D 2300/611* (2013.01)

(58) Field of Classification Search
CPC ......... B33Y 10/00; B33Y 80/00; B33Y 30/00; B33Y 70/00; B33Y 90/00; C23C 23/04; F05D 2230/31; F05D 2230/90; F05D 2240/303; F05D 2300/13; F05D 2300/611; F01D 5/28; F01D 5/288
See application file for complete search history.

(56) References Cited

U.S. PATENT DOCUMENTS

| | | | |
|---|---|---|---|
| 5,908,285 A | 6/1999 | Graff | |
| 7,186,092 B2 | 3/2007 | Bruce et al. | |
| 8,261,444 B2 | 9/2012 | Calla et al. | |
| 9,140,130 B2 * | 9/2015 | Mironets | ............ B22F 5/04 |
| 2006/0166020 A1* | 7/2006 | Raybould | ............ C23C 24/04 |
| | | | 428/471 |
| 2011/0129351 A1 | 6/2011 | Das et al. | |

(Continued)

OTHER PUBLICATIONS

Deltech, F. (Jun. 11, 2013). Niobium (UNS R04210). AZoM. https://www.azom.com/article.aspx?ArticleID=7638 (Year: 2013).*

(Continued)

*Primary Examiner* — Kenneth Bomberg
*Assistant Examiner* — Joshua R Beebe
(74) *Attorney, Agent, or Firm* — Walters & Wasylyna LLC

(57) ABSTRACT

A system and method for fabricating a protective leading-edge structure for an airfoil includes system includes a mandrel and a cold spray additive manufacturing apparatus. The cold spray additive manufacturing apparatus is configured to deposit a metallic powder on a tool surface of the mandrel to form an inner layer, intermediate layers, and an outer layer of the leading-edge structure. The inner layer forms an inner surface of the leading-edge structure. The outer layer forms an outer surface of the leading-edge structure. The intermediate layers form a thickness of the leading-edge structure. The inner surface of the leading-edge structure is configured to be coupled to the airfoil such that the outer surface of the leading-edge structure forms a portion of a leading edge and a portion of an aerodynamic surface of the airfoil.

20 Claims, 10 Drawing Sheets

(56) References Cited

U.S. PATENT DOCUMENTS

| | | | |
|---|---|---|---|
| 2013/0101432 A1* | 4/2013 | Harris, Jr. | F01D 5/288 |
| | | | 416/241 R |
| 2013/0236323 A1 | 9/2013 | Mironets et al. | |
| 2021/0402478 A1* | 12/2021 | Nault | B22F 10/30 |
| 2021/0402482 A1* | 12/2021 | Ferguson | C23C 8/24 |

OTHER PUBLICATIONS

Unknown. (Feb. 26, 2021). Hardness Conversion Chart. Tubing Central, Hardness Conversion Chart. https://tubingcentral.com/wp-content/uploads/2017/12/Hardness-Conversion-Chart.pdf (Year: 2021).*

European Patent Office, Extended European Search Report, App. No. 241585561 (Aug. 29, 2024).

Ely R. et al.: "Demonstration of rotor blades with increased environmental durability," Annual Forum Proceedings—AHS International—67th American Helicopter Society International Forum 2011, 2011 American Helicopter Society USA, vol. 3, pp. 1880-1893 (2011).

Devi et al.: "Assessing critical process condition for bonding in cold spraying," Surface and Coatings Technology, vol. 470, pp. 129839 (Oct. 1, 2023).

* cited by examiner

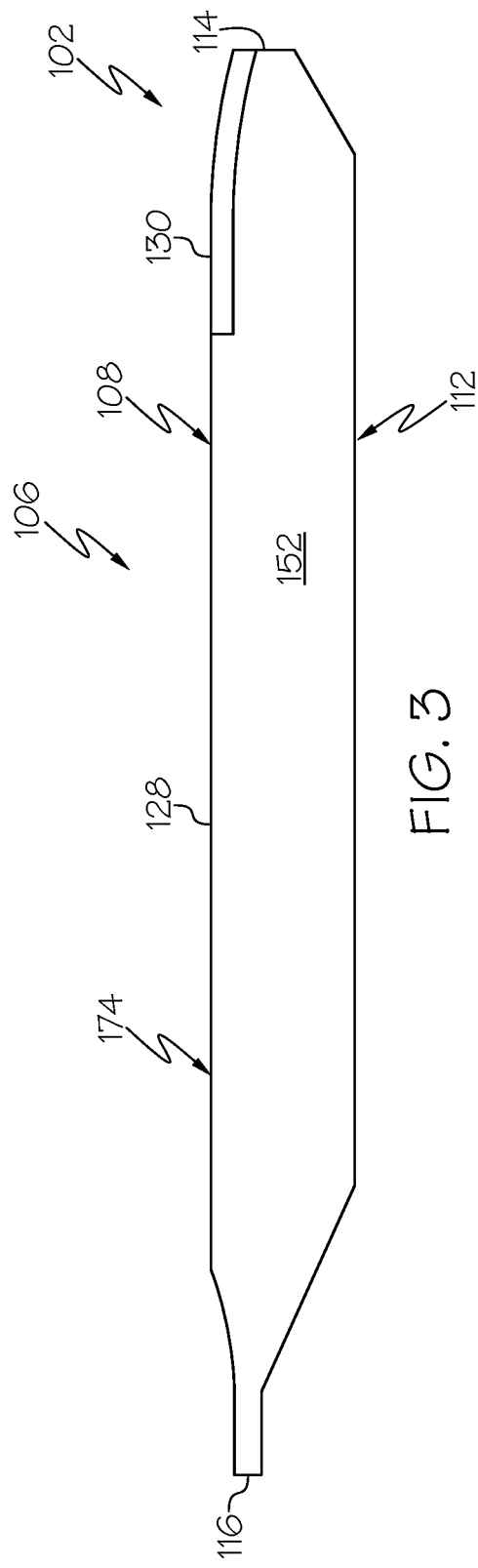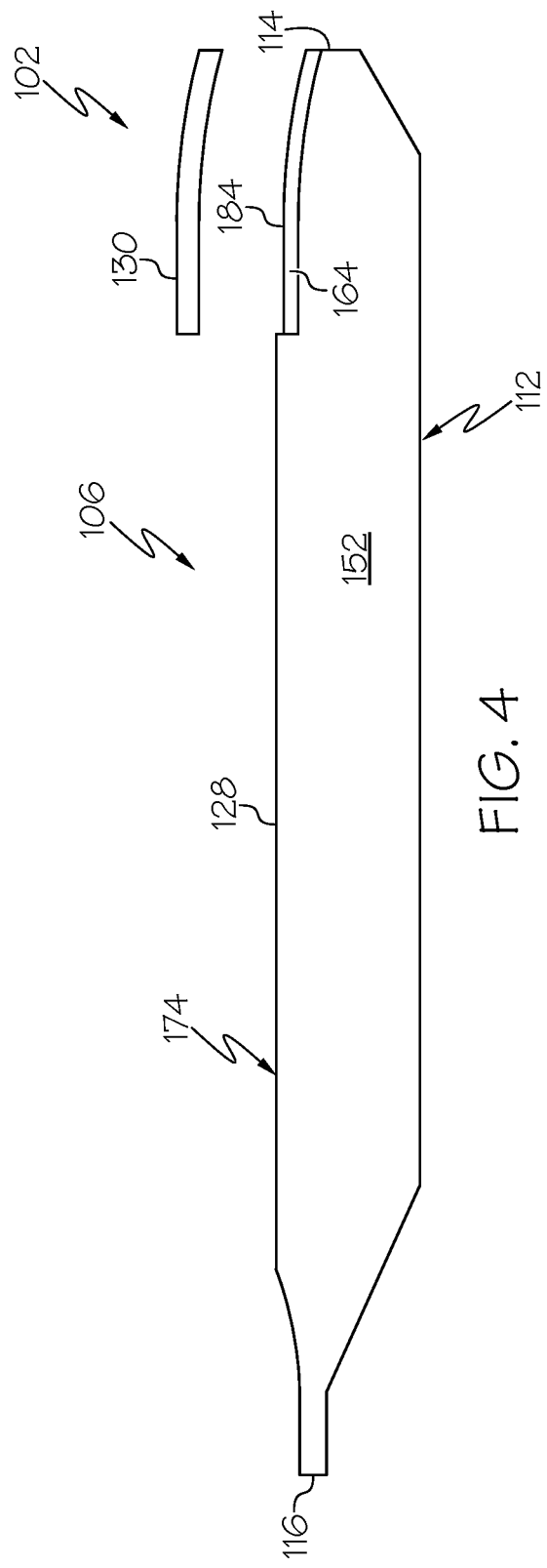

LEADING-EDGE STRUCTURES FOR AIRFOILS AND SYSTEMS AND METHODS FOR FABRICATING THE SAME

FIELD

The present disclosure relates generally to aerodynamic structure manufacturing and, more particularly, to systems and methods for fabricating leading-edge structures for airfoils, such as rotor blades, using cold spray additive manufacturing.

BACKGROUND

The leading edges of airfoils, such as helicopter rotors, airplane propellers, turbine rotors, and other rotating airfoils, are subject to wear, erosion, and/or damage from the impact of airborne foreign objects during operation. As such, covers made of materials that are impact and wear resistant, such as titanium, steel, nickel, and alloys thereof have been fitted on airfoils to provide protection to the leading edge. However, as the aerodynamic design and geometry of airfoils have evolved, it has become increasingly challenging to fabricate material covers for leading edges using conventional manufacturing techniques. Accordingly, those skilled in the art continue with research and development efforts in the field of aerodynamic structure manufacturing.

SUMMARY

Disclosed are examples of a system for fabricating a leading-edge structure for an airfoil, a method for fabricating a leading-edge structure for an airfoil, a leading-edge structure for an airfoil fabricated using the system or according to the method, an airfoil, and a method for manufacturing an airfoil. The following is a non-exhaustive list of examples, which may or may not be claimed, of the subject matter according to the present disclosure.

In an example, the disclosed system includes a mandrel that includes a tool surface. The system includes a cold spray additive manufacturing apparatus. The cold spray additive manufacturing apparatus is configured to deposit a metallic powder on the tool surface of the mandrel to form an inner layer of the leading-edge structure. The cold spray additive manufacturing apparatus is configured to deposit the metallic powder on the inner layer to form intermediate layers of the leading-edge structure. The cold spray additive manufacturing apparatus is configured to deposit the metallic powder on the intermediate layers to form an outer layer of the leading-edge structure. The inner layer forms an inner surface of the leading-edge structure. The outer layer forms an outer surface of the leading-edge structure that is opposite the inner surface and a thickness of the leading-edge structure between the inner surface and the outer surface. The intermediate layers form a thickness of the leading-edge structure between the inner surface and the outer surface. The inner surface of the leading-edge structure is configured to be coupled to the airfoil such that the outer surface of the leading-edge structure forms a portion of a leading edge and a portion of an aerodynamic surface of the airfoil.

In an example, the disclosed method includes steps of: (1) cold spraying a metallic powder on a tool surface of a mandrel to form an inner layer of the leading-edge structure; (2) cold spraying the metallic powder on the inner layer to form intermediate layers of the leading-edge structure; and (3) cold spraying the metallic powder on the intermediate layers to form an outer layer of the leading-edge structure. The inner layer forms an inner surface of the leading-edge structure. The outer layer forms an outer surface of the leading-edge structure that is opposite the inner surface. The intermediate layers form a thickness of the leading-edge structure between the inner surface and the outer surface. The inner surface of the leading-edge structure is configured to be coupled to the airfoil such that the outer surface of the leading-edge structure forms a portion of a leading edge and a portion of an aerodynamic surface of the airfoil.

In an example, the disclosed leading-edge structure includes an inner surface that is configured to be coupled to the airfoil. The leading-edge structure includes an outer surface that is opposite the inner surface and that is configured to form a portion of a leading edge and a portion of an aerodynamic surface of the airfoil. The leading-edge structure is fabricated by depositing Niobium powder on a tool surface of a mandrel using a cold spray additive manufacturing process.

In an example, the disclosed airfoil includes a composite body. The composite body includes a tip and a root that is opposite the tip. The composite body includes a leading edge including a leading-edge first portion that extends from the root toward the tip. The composite body includes a trailing edge that is opposite the leading edge and that extends from the root to the tip. The airfoil also includes a leading-edge structure that is coupled to the leading edge of the composite body and that forms a leading-edge second portion of the leading edge that extends from the leading-edge first portion to the tip. The leading-edge structure is fabricated by depositing Niobium powder on a tool surface of a mandrel using a cold spray additive manufacturing process.

In an example, the disclosed method includes steps of: (1) fabricating a composite body including a tip, a root that is opposite the tip, a leading edge including a leading-edge first portion that extends from the root toward the tip, and a trailing edge that is opposite the leading edge and that extends from the root to the tip; (2) fabricating a leading-edge structure by depositing Niobium powder on a tool surface of a mandrel using a cold spray additive manufacturing process; and (3) coupling the leading-edge structure the leading edge of the composite body to form a leading-edge second portion that extends from the leading-edge first portion to the tip.

Other examples of the system, the methods, the leading-edge structure, and the airfoil disclosed herein, will become apparent from the following detailed description, the accompanying drawings, and the appended claims.

BRIEF DESCRIPTION OF THE DRAWINGS

FIG. 3 is a schematic, plan view of an example of a rotor blade with a leading-edge structure;

FIG. 4 is a schematic, exploded, plan view of an example of the rotor blade and the leading-edge structure;

DETAILED DESCRIPTION

Referring to FIGS. 1-12, by way of examples, the present disclosure is directed to a system 100 and a method 1000 for fabricating a leading-edge structure 102 of an airfoil 104. More particularly, the system 100 and method 1000 are directed to fabricating the leading-edge structure 102 using a cold spray additive manufacturing process that utilizes a single composition build material and single build-up mandrel. By way of examples, the present disclosure is also directed to the leading-edge structure 102 of the airfoil 104 that is fabricated using the system 100 and/or according to the method 1000. By way of examples, the present disclosure is further directed to the airfoil 104 that includes the leading-edge structure 102 forming a portion of a leading edge of the airfoil 104. By way of examples, the present disclosure is additionally directed to a method 2000 for manufacturing the airfoil 104.

In the examples illustrated herein, the airfoil 104 includes or takes the form of a rotor blade of a helicopter or other rotorcraft. However, in other examples, the airfoil 104 can include or take the form of airplane propellers, turbine rotor blades, fan rotor blades, and other rotating airfoils.

The present disclosure recognizes that in efforts to increase operating efficiencies of modern aircraft it is desirable to decrease weights while maintaining strength of component parts. Decreases in weights without decreases in strengths of components, such as rotor blades propeller blades, fan blades, and the like, have been achieved through the use of composite materials, including, for example fiber-reinforced polymer composites. Additionally, use of composites has also enabled high-efficiency aerodynamic designs with complex surface geometries, which are not feasible using traditional materials. However, composite blades may need to be reinforced at their leading edges to provide adequate strength to protect the blade from erosion and foreign object damage. Conventional techniques for providing leading-edge protection of rotor blades, propeller blades, fan blades, and other airfoil blades, such as electro-forming and thermo-mechanical forming, are increasingly challenging as the aerodynamic geometries of the composite blades become more complex. Further, conventional materials and techniques for fabricating and attaching leading-edge protection may be inadequate for modem aircraft. The present disclosure addresses the above-identified problems with leading-edge protection of blades and other airfoils by fabricating the leading-edge structure 102 using unique cold spray additive manufacturing techniques.

Figure 1:
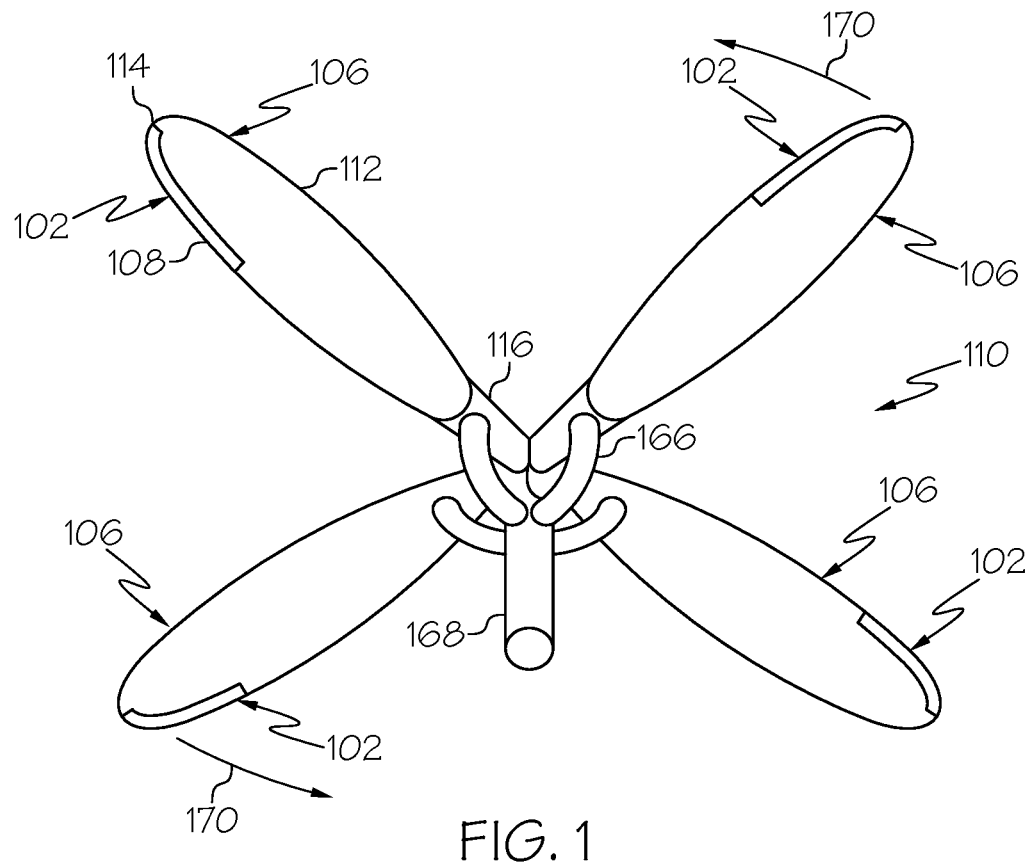
FIG. 1 is a schematic, perspective view of an example of a rotor.

FIG. 1 schematically illustrates an example of a rotor 110 of a rotorcraft. The rotor 110 includes a plurality of rotor blades 106, also referred to singularly as rotor blade 106.

Figure 10:
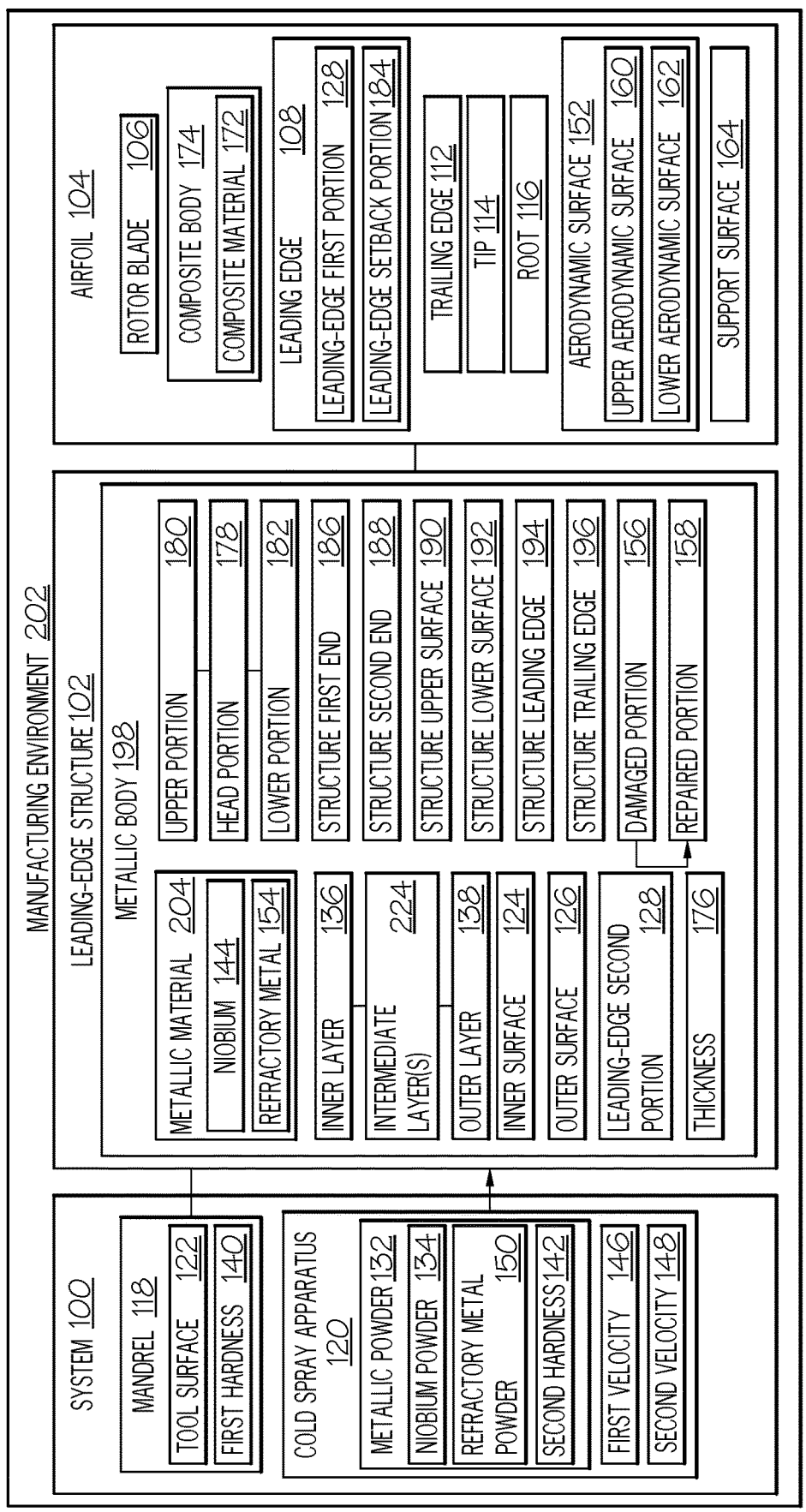
FIG. 10 is a schematic block diagram of examples of the manufacturing environment, an airfoil, and the leading-edge structure.

The rotor blades 106 are examples of the airfoil 104 (FIG. 10). Each of the rotor blades 106 includes a leading edge 108, a trailing edge 112, a tip 114, a root 116, an upper aerodynamic surface 160, and a lower aerodynamic surface 162. The rotor blades 106 are coupled to a hub 166 at the root 116. A rotor mast 168 is coupled to the hub 166 and rotates the rotor blades 106 in the direction of directional arrows 170. Each of the rotor blades 106 is made of a composite material 172 (FIG. 10), such as a fiber-reinforced polymer (FRP). Each of the rotor blades 106 includes the leading-edge structure 102. The leading-edge structure 102 is coupled (e.g., bonded or adhered) to the rotor blade 106 to form a single structural unit and, thereby, protects at least a portion of the leading edge 108 of the rotor blade 106 from impact and erosion, wear, and/or damage.

In one or more examples, the leading-edge structure 102 is coupled to and protects an outboard end or outboard portion of the leading edge 108 of the rotor blade 106. In one or more examples, the leading-edge structure 102 is coupled to and protects the outboard portion and an intermediate portion of the leading edge 108 of the rotor blade 106. In one or more examples, the leading-edge structure 102 is coupled to and protects the outboard portion, the intermediate portion, and an inboard portion of the leading edge 108 of the rotor blade 106.

Generally, the leading-edge structure 102 carries a portion of the load applied to the airfoil 104 (e.g., the rotor blade 106) during operation. The leading-edge structure 102 also has a level of strain-ability to permit compliance with underlying airfoil structure and any adhesive bondline between the airfoil 104 and the leading-edge structure 102. As such, when used to describe the leading-edge structure 102, "strength" refers to both resistance to impact, erosion, and wear and the capacity to carry aerodynamic loads.

In one or more examples, a single instance or segment of the leading-edge structure 102 (e.g., one leading-edge structure segment) is coupled to the rotor blade 106 or airfoil 104 to protect a desired portion of the leading edge 108 between the root 116 and the tip 114. In one or more examples, a plurality of instances or segments of the leading-edge structure 102 (e.g., a series of leading-edge structure segments) are coupled to the rotor blade 106 or airfoil 104 along a spanwise direction to protect desired portions of the leading edge 108 between the root 116 and the tip 114. In one or more examples, one or more of the leading-edge structure segments can be made using different manufacturing processes, can be made using different materials, and/or can have a size and shape dictated by the airfoil operating environment, material, coverage, and thickness.

Figure 2:
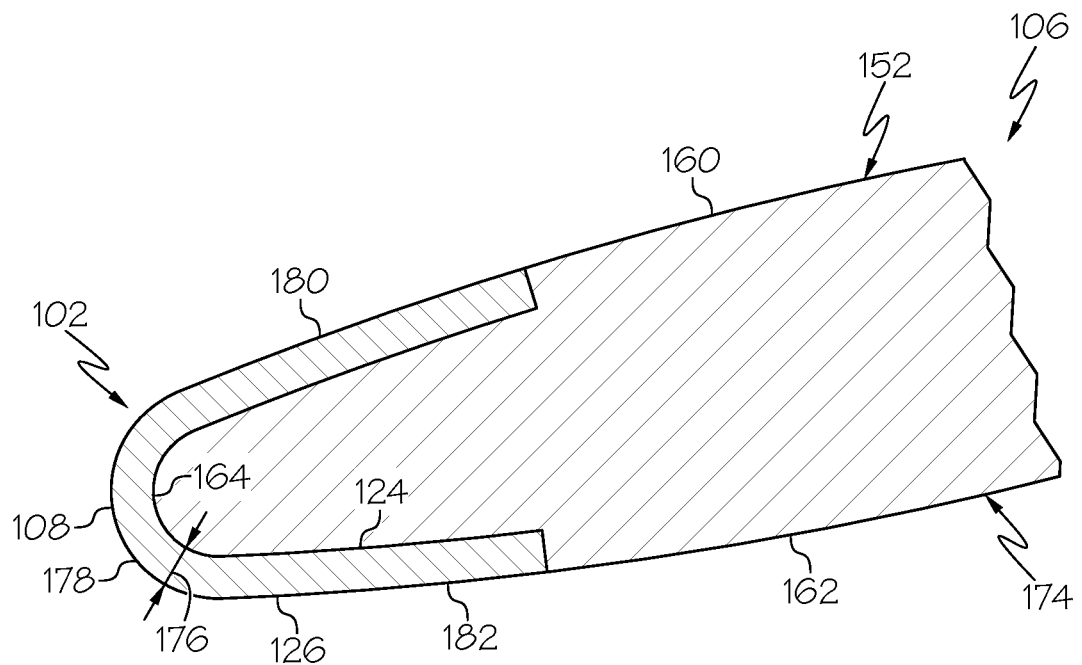
FIG. 2 is a schematic, sectional view of a portion of an example of a rotor blade.

FIG. 2 schematically illustrates an example of a portion of one of the rotor blades 106 (FIG. 1). The rotor blade 106 illustrated in FIG. 2 is an example of the airfoil 104 (FIG. 10). The rotor blade 106 includes an aerodynamic surface 152, such as the upper aerodynamic surface 160 (e.g., a suction side or low-pressure side) and the lower aerodynamic surface 162 (e.g., a pressure side or high-pressure side). The rotor blade 106 includes a composite body 174 made of the composite material 172 (FIG. 10), such as a fiber-reinforced polymer composite material, and, for example, a having an airfoil shape (e.g., an airfoil body). The leading-edge structure 102 is coupled to a support surface 164 of the composite body 174 of the rotor blade 106.

FIG. 2 illustrates an example of the leading-edge structure 102 with a thickness 176 that is approximately constant in the chordwise direction. The present disclosure recognizes that it is more common for airfoil and blade designs to have a thickness that is tapered in the chordwise direction. Additionally, fabricating the leading-edge structure 102 that includes a complexity of thickness tapers is an advantage of using the cold spray process. Additionally, the example illustrated in FIG. 2 is free of extra layer error stackups.

In one or more examples, the support surface 164 includes a structural substrate or otherwise provides or serves as an underlying support and attachment surface for the leading-edge structure 102. For example, the support surface 164 forms a portion of the outer mold line (OML) of the rotor blade 106 made of the composite material 172. The support surface 164 is set back (e.g., offset) from the aerodynamic surface 152 of the rotor blade 106 such that a recess is formed that receives the leading-edge structure 102. The recess or offset dimensions of the support surface 164 from the aerodynamic surface 152 of the rotor blade 106 is equal to the thickness 176 of the leading-edge structure 102 and any adhesive used to bond the leading-edge structure 102 to the rotor blade 106. As such, with the leading-edge structure 102 coupled to the support surface 164 of the rotor blade 106, the leading-edge structure 102 forms a portion of the leading edge 108 of the rotor blade 106 and a portion of the aerodynamic surface 152 of the rotor blade 106.

In one or more examples, the leading-edge structure 102 is bonded to the underlying blade structure (the support surface 164), for example, using a structural adhesive that meets an interface stress and strain environment. In one or more examples, the leading-edge structure 102 is bonded to the rotor blade 106 before cure of the composite material 172 and the rotor blade 106 is cured with the leading-edge structure 102 in place. In one or more examples, the rotor blade 106 is cured and then the leading-edge structure 102 is bonded to the rotor blade 106.

In one or more examples, the leading-edge structure 102 includes an inner surface 124, an outer surface 126 that is opposite the inner surface 124, and the thickness 176 between the inner surface 124 and the outer surface 126. The inner surface 124 forms the inner geometry of the leading-edge structure 102. The inner surface 124 of the leading-edge structure 102 is configured (e.g., suitably sized, shaped, etc.) to be complementary to or to substantially match a contour of the support surface 164 such that the inner surface 124 and the support surface 164 are in intimate mating contact with the leading-edge structure 102 is coupled to the rotor blade 106. In one or more examples, the inner surface 124 is adhesively bonded to the support surface 164. With the leading-edge structure 102 coupled to the rotor blade 106, the outer surface 126 forms a portion of the leading edge 108 of the rotor blade 106 and a portion of the aerodynamic surface 152 of the rotor blade 106. For example, the leading-edge structure 102 is fabricated using cold spray additive manufacturing having the appropriate values for the thickness 176 such that the outer surface 126 of the leading-edge structure 102 has a contour that extends continuously from the aerodynamic surface 152 of the rotor blade 106.

In one or more examples, the leading-edge structure 102 includes a head portion 178, an upper portion 180, and a lower portion 182. The head portion 178 forms a leading-edge apex of the leading-edge structure 102 and is configured to be situated along the leading edge 108 of the rotor blade 106. The upper portion 180 extends from the head portion 178 toward the trailing edge 112 of the rotor blade 106. The lower portion 182 extends from the head portion 178, opposite the upper portion 180, toward the trailing edge 112 of the rotor blade 106. The outer surface 126 of the head portion 178 of the leading-edge structure 102 is configured to form a portion of the leading edge 108 of the rotor blade 106. The outer surface 126 of the upper portion 180 is configured to form a portion of the upper aerodynamic surface 160 of the rotor blade 106. The outer surface 126 of the lower portion 182 is configured to form a portion of the lower aerodynamic surface 162 of the rotor blade 106.

In one or more examples, the thickness 176 of the leading-edge structure 102 is constant in the chordwise direction and/or the spanwise direction. In one or more examples, the thickness 176 of the leading-edge structure 102 varies in the chordwise direction and/or the spanwise direction.

In one or more examples, the thickness 176 of the leading-edge structure 102 includes a thickness taper distribution in one or more directions. The thickness taper distribution is based on chordwise and/or a spanwise changes to design that are optimized for erosion wear based on impact angles, impact speeds, and erodent concentrations. Additionally, the thickness changes can be optimized or balanced for weight, weight distribution, structural life, and bondline life. The thickness taper distribution of the leading-edge structure 102 can vary. In one or more examples, areas of the thickness 176 from a structure leading edge 194 of the leading-edge structure 102 to a structure trailing edge 196 of the leading-edge structure 102 have a ratio greater than five times (5×), such as ten times (10×) or more. For example, the thickness 176 of the head portion 178 or of leading ends of the upper portion 180 and/or lower portion 182 can be greater than five times the thickness 176 of trailing ends of the upper portion 180 and/or lower portion 182. For example, the thickness 176 at the head portion 178 or of leading ends of the upper portion 180 and/or lower portion 182 is approximately 0.1 inch and the thickness 176 at trailing ends of the upper portion 180 and/or lower portion 182 is approximately 0.01 inch.

FIGS. 3 and 4 schematically illustrate examples of the rotor blade 106 and the leading-edge structure 102. FIG. 3 depicts the leading-edge structure 102 coupled to the rotor blade 106. FIG. 4 depicts the leading-edge structure 102 separated from the rotor blade 106. As illustrated in the FIG. 3, after attachment of the leading-edge structure 102 (e.g., with the leading-edge structure 102 attached), the leading edge 108 of the rotor blade 106 includes a leading-edge first portion 128 and a leading-edge second portion 130. The leading-edge first portion 128 extends from proximate (e.g., at or near) the root 116 of the rotor blade 106 toward the tip 114. The leading-edge second portion 130 extends from the leading-edge first portion 128 to proximate (e.g., at or near) the tip 114. The leading-edge first portion 128 is formed by the aerodynamic surface 152 of the composite body 174 of the rotor blade 106. The leading-edge second portion 130 is formed by an aerodynamic surface of a metallic body 198 of the leading-edge structure 102. The leading-edge first portion 128 and the leading-edge second portion 130 form or are situated along the outer mold line of rotor blade 106. As illustrated in FIG. 4, in one or more examples, the rotor blade 106 is fabricated such that the leading edge 108 includes or is formed by the leading-edge first portion 128 and a leading-edge setback portion 184. In other words, prior to attachment of the leading-edge structure 102 (e.g., without the leading-edge structure 102 being attached), the leading edge 108 of the rotor blade 106 includes the leading-edge first portion 128 and the leading-edge setback portion 184. The leading-edge first portion 128 forms or is situated along the outer mold line of rotor blade 106. The leading-edge setback portion 184 is formed by the support surface 164 of the rotor blade 106. The leading-edge setback portion 184 is offset from the outer mold line of rotor blade 106 and the leading-edge first portion 128.

Figure 5:
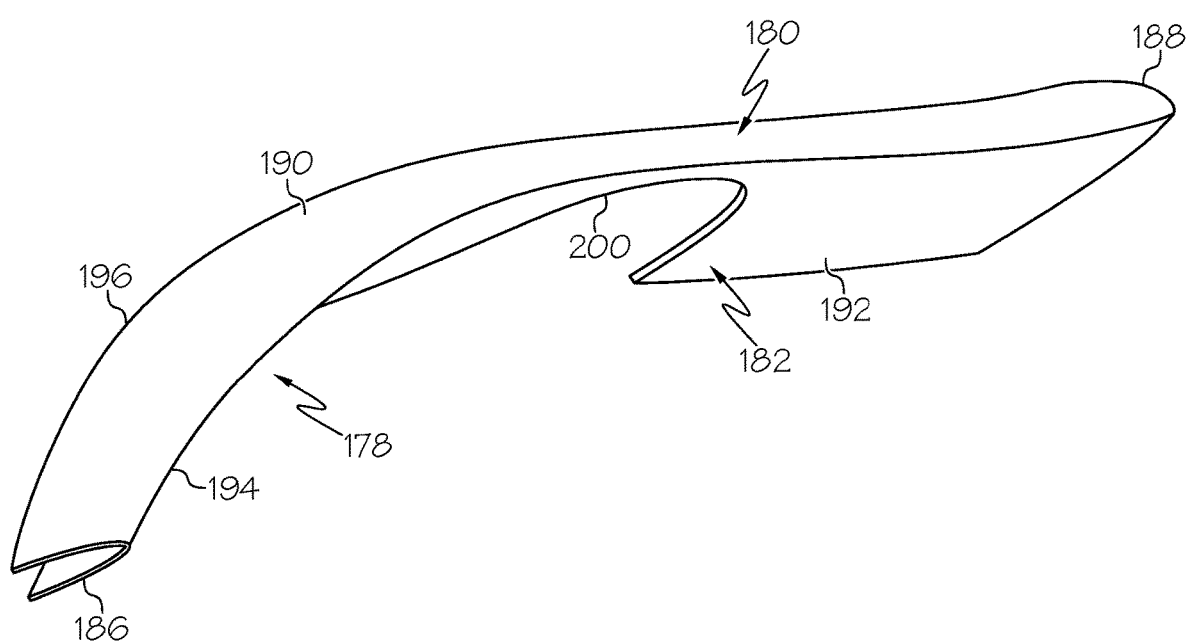
FIG. 5 is a schematic, perspective view of an example of the leading-edge structure.
Figure 6:
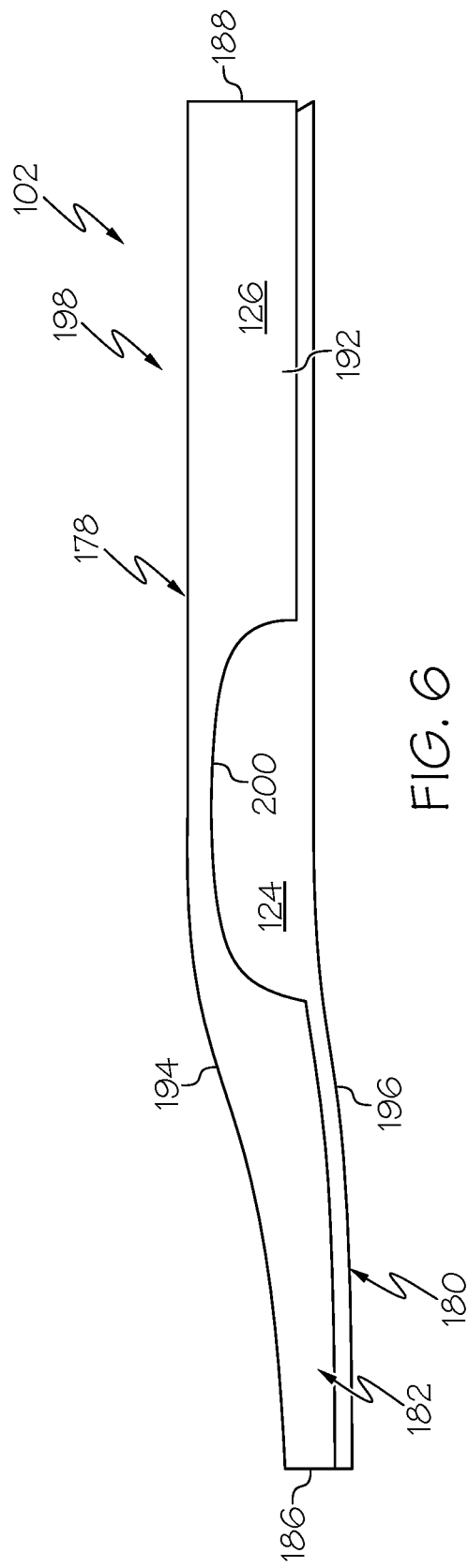
FIG. 6 is a schematic, elevational view of an example of the leading-edge structure.
Figure 7:
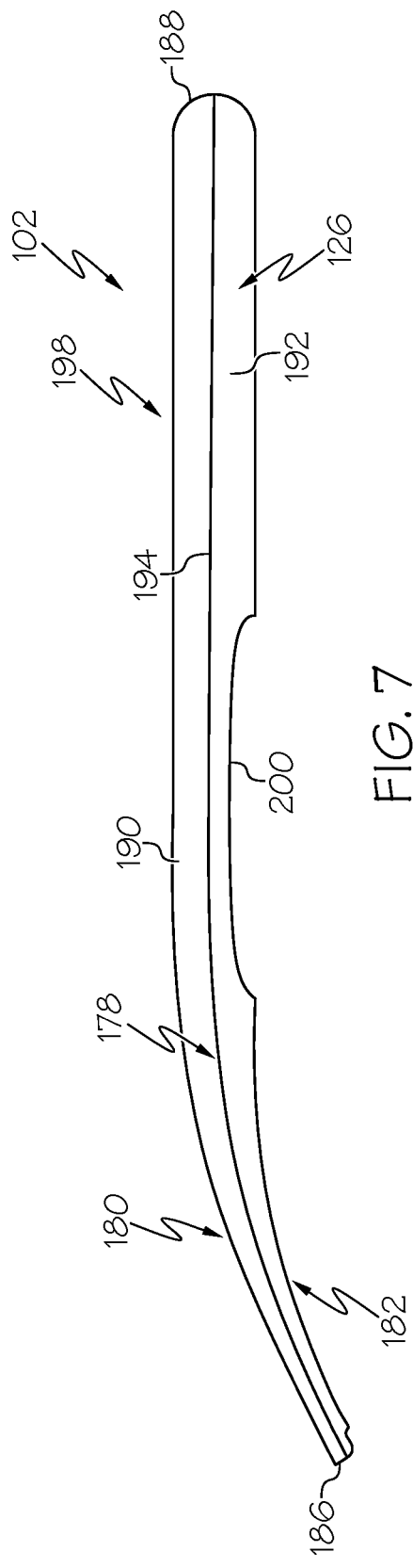
FIG. 7 is a schematic, plan view of an example of the leading-edge structure.

FIGS. 5-7 schematically illustrate examples of the leading-edge structure 102. In one or more examples, the leading-edge structure 102 includes the metallic body 198 (FIG. 10) and has an airfoil shape. Generally, the airfoil shape of the metallic body 198 of the leading-edge structure 102 complementarily matches the airfoil shape of a portion of the composite body 174 of the rotor blade 106.

The metallic body 198 of the leading-edge structure 102 includes a structure first end 186, a structure second end 188, a structure upper surface 190 (e.g., upper airfoil surface), a structure lower surface 192 (e.g., a lower airfoil surface), the structure leading edge 194, and the structure trailing edge 196. The structure first end 186 is configured to be situated proximate to or to form a portion of the tip 114 of the rotor blade 106 (FIG. 3). The structure second end 188 is opposite the structure first end 186 along a longitudinal axis of the leading-edge structure 102 and is configured to be spaced away from the tip 114 of the rotor blade 106 toward the root 116 of the rotor blade 106. The structure leading edge 194 is configured to form a portion of the leading edge 108 of the rotor blade 106, such as the leading-edge second portion 130 (FIG. 3). For example, the structure leading edge 194 is formed by a portion of the outer surface 126 of the head portion 178 of metallic body 198 of the leading-edge structure 102. The structure trailing edge 196 is opposite the structure leading edge 194, in the chordwise direction, and is configured to abut a portion of the composite body 174 of the rotor blade 106 such that the structure upper surface 190 forms a continuous aerodynamic surface contour with the upper aerodynamic surface 160 of the rotor blade 106 and that the structure lower surface 192 forms a continuous aerodynamic surface contour with the lower aerodynamic surface 162 of the rotor blade 106 (FIG. 2). The structure upper surface 190 is formed by a portion of the outer surface 126 of the upper portion 180 of the metallic body 198 of the leading-edge structure 102. The structure lower surface 192 is formed by a portion of the outer surface 126 of the lower portion 182 of the metallic body 198 of the leading-edge structure 102.

In various examples, the aerodynamic geometry of the leading-edge structure 102 depends on one or more factors, such as, but not limited to, the type of airfoil or blade to which the leading-edge structure 102 is to be attached, the type of machine (e.g., rotorcraft, airplane, fan, etc.) for which the leading-edge structure 102 is to be used, and/or the operating conditions under which the leading-edge structure 102 is to be used. In one or more examples, the metallic body 198 of the leading-edge structure 102, as fabricated using the cold spray process, has a complex aerodynamic shape and/or a complex shape of the structure leading edge 194. In one or more examples, a chordwise dimension (e.g., chord width) of the leading-edge structure 102 at the structure second end 188 is greater (e.g., two times greater) than the chordwise dimension (e.g., chord width) of the leading-edge structure 102 at the structure first end 186. In one or more examples, the leading-edge structure 102 has a taper in the chordwise direction. In one or more examples, the leading-edge structure 102 has a dihedral shape or is configured for use with dihedral blades or airfoils having a positive (e.g., upward) slope. In one or more examples, the leading-edge structure 102 has an anhedral shape or is configured for use with anhedral blades of airfoil having a negative (e.g., downward) slope. In one or more examples, the leading-edge structure 102 includes a profile that transitions between different geometries. In one or more examples, the leading-edge structure 102 includes a non-linear twist about the spanwise direction. In one or more examples, the thickness 176 of the leading-edge structure 102 varies to form a taper from a thicker section at the head portion 178 or along the structure leading edge 194 to a thinner section along the upper portion 180 and/or the lower portion 182 toward the structure trailing edge 196. In one or more examples, the metallic body 198 of the leading-edge structure 102 includes an access or periphery cut-out 200.

In one or more examples, the leading-edge structure 102, fabricated using the system 100 and/or according to the method 1000, includes any desired geometry having various degrees of complexity. In one or more examples, the leading-edge structure 102 includes a length (e.g., span distance from structure first end 186 to the structure second end 188) and a width (e.g., chord distance from the structure leading edge 194 to the structure trailing edge 196) ratio from approximately 5:1 through approximately 20:1, such as approximately 12:1. In one or more examples, the leading-edge structure 102 includes a swept tip, for example, the structure leading edge 194 and/or the structure trailing edge 196 of the leading-edge structure 102 are not in straight line. In one or more examples, the leading-edge structure 102 includes one of a dihedral and anhedral, for example, along z-axis or in a flap direction in which the airfoil 104 goes up and back down, respectively. In one or more examples, the leading-edge structure 102 accommodates airfoil profile transition in which the airfoil shape along the chord changes over the length, for example, goes from thicker to thinner. In one or more examples, the leading-edge structure 102 includes a chord distance taper in which a distance along the chord direction from the structure leading edge 194 to the structure trailing edge 196 changes over the length and/or the airfoil profile scales from larger to smaller. In one or more examples, the leading-edge structure 102 includes a non-linear twist in which a chordline angle rotation varies over the length. In one or more examples, the leading-edge structure 102 includes thickness taper distributions in which a chordwise thickness changes from the structure leading edge 194 to the structure trailing edge 196 and/or a spanwise thickness change from inboard end (e.g., structure first end 186) to an outboard end (e.g., structure second end 188). In one or more examples, the leading-edge structure 102 includes a number of cut-out features, such as the cut-out 200 (FIG. 6). In one or more examples, the leading-edge structure 102 is fabricated to include a desired airfoil profile and other geometry dimensional tolerances. In one or more examples, the leading-edge structure 102 includes a desired surface finish, for example, a smooth surface finish that generally avoids excessive over-deposit and/or surface effects at the inner mold surface for bonding. In one or more examples, the leading-edge structure 102 includes other features, such as "pan-downs" or recess of airfoil profile meant to go underneath an adjacent leading-edge part.

In one or more examples, the airfoil 104, such as the rotor blade 106, has a very small upper and lower airfoil radii over its profile transition. As such, in one or more examples, an inner radius of the head portion 178 of the leading-edge structure 102 formed by the inner surface 124 is different that an outer radius of the head portion 178 of the leading-edge structure 102 formed by the outer surface 126. In one or more examples, the inner radius is less than the outer radius.

Figure 8:
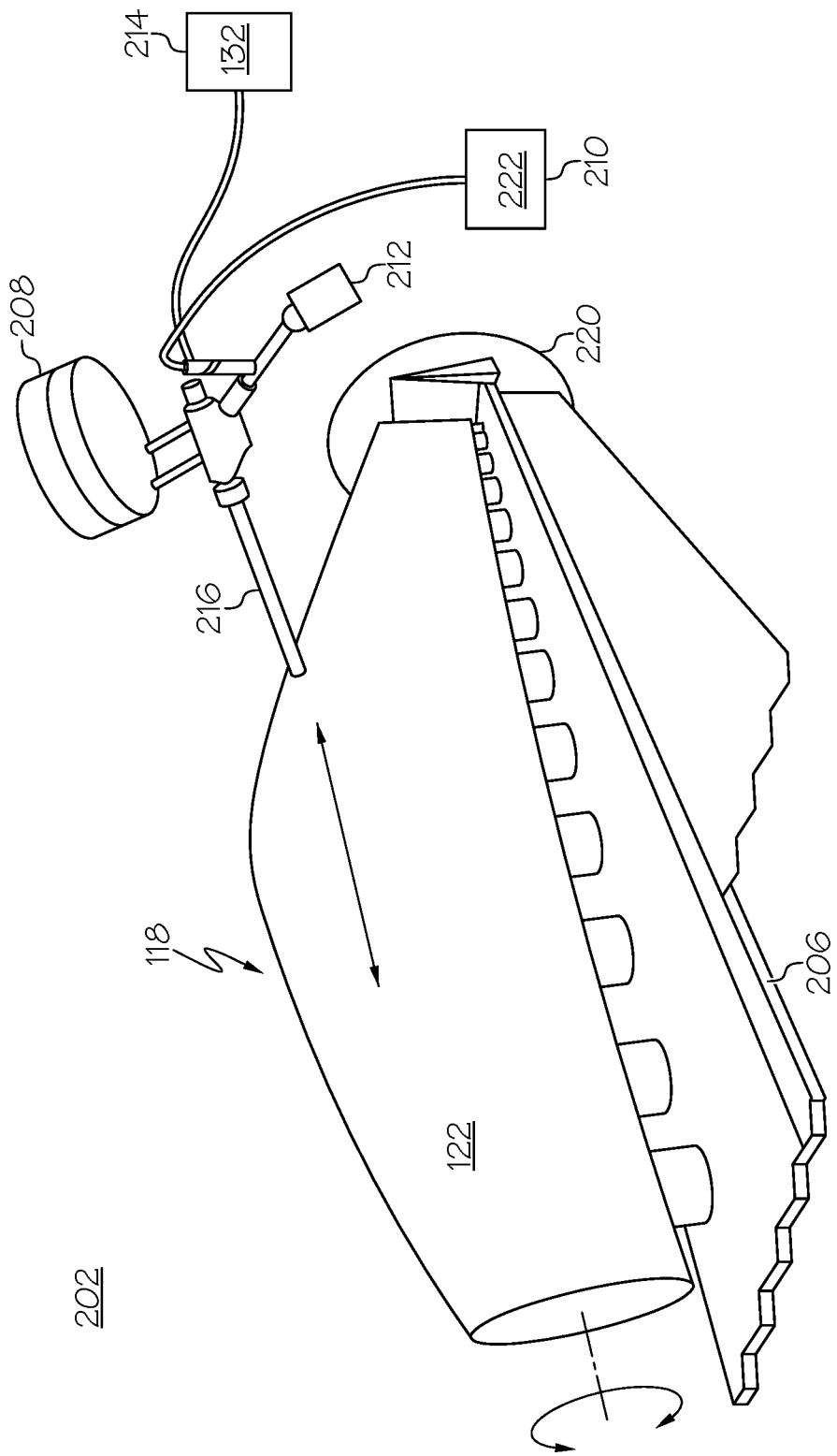
FIG. 8 is a schematic illustration of an example of a manufacturing environment for fabricating the leading-edge structure using a cold spray process.
Figure 9:
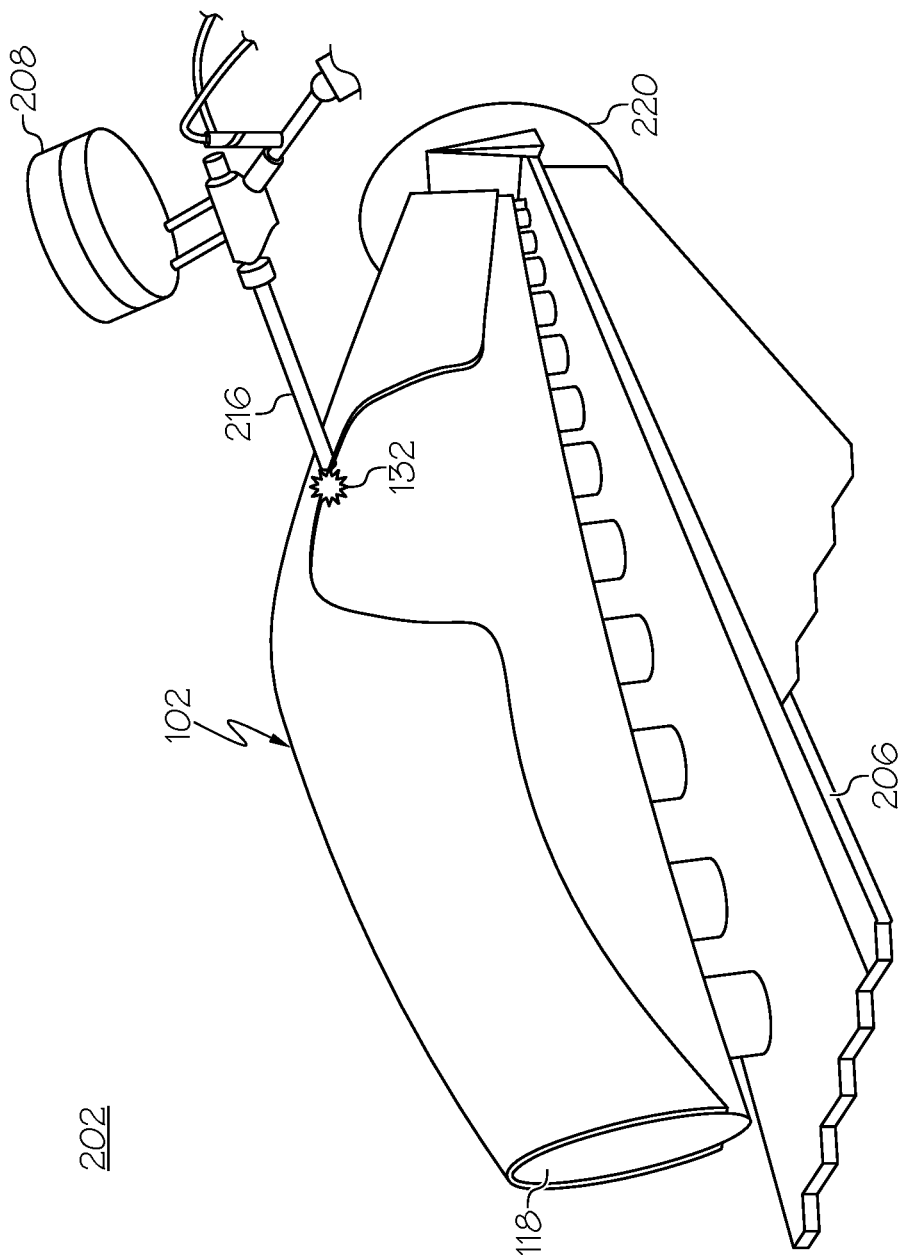
FIG. 9 is a schematic illustration of an example of fabricating the leading-edge structure using a cold spray process.

FIG. 8 schematically illustrates an example of the system 100 and a manufacturing environment 202 within which the system 100 operates to fabricate the leading-edge structure 102. FIG. 9 schematically illustrates an example of the leading-edge structure 102 being fabricated by a cold spray process using the system 100. Generally, the system 100 includes a mandrel 118 and a cold spray additive manufacturing apparatus 120, which may also be referred to herein as a cold spray apparatus 120. The cold spray apparatus 120 is configured to perform a cold spray process or cold spray deposition.

As used herein, "cold spray process" or "cold spray deposition" refer to solid-state processes that generally involve fluidizing a fine (micron) metal powder in a stream of gas, such as helium or other inert gas, before spraying the resulting powder and gas mixture directly through a nozzle at sonic velocities, thereby causing the accelerated metal powders to impact a build surface with sufficient force to establish an interfacial bond between the deposited powdered metallic material and the build surface. Such processes are referred to as "cold" technologies because of the relatively low temperatures of the gas/powder stream upon impact with a substrate. In the present disclosure, the substrate is the mandrel 118.

The cold spray apparatus 120 is configured to perform a suitable cold spray process, in which the cold spray apparatus 120 accelerates a metallic powder 132 at very high velocities toward a tool surface 122 of the mandrel 118 using a fluid. The fluid is generally a gaseous fluid, such as nitrogen or helium. As the particles of the metallic powder 132 hit the tool surface 122 of the mandrel 118, the particles of the metallic powder 132 plastically deform locally so that the metallic powder 132 can bond to the tool surface 122 of the mandrel 118. As such, the tool surface 122 of the mandrel 118 defines a shape of the inner surface 124 of the metallic body 198 of the leading-edge structure 102. After the particles of the metallic powder 132 have built a layer (e.g., an inner layer 136 of the metallic body 198) on the mandrel 118, new particles of the metallic powder 132 deform on the surface of the inner layer 136 they hit and bond to the inner layer 136 and then new particles of the metallic powder 132 deform on the surface of the previously built layer they hit and bond to that previously build layer, thereby subsequently forming a number of intermediate layers 224 build on previous layers and building up the thickness 176 of the metallic body 198 of the leading-edge structure 102 until forming an outer layer 138 that forms the outer surface 126 of the leading-edge structure 102.

In one or more examples, the cold spray process of plastic deformation is facilitated by a process that can accelerate particles of the metallic powder 132 to velocities in the range of about 300 meters/second to about 1500 meters/second. This is achieved by accelerating a fluid to velocities generally higher than those desired from the particles of the metallic powder 132 and then allowing the particles of the metallic powder 132 to drag in the fluid flow. Temperatures of the fluid used to propel the particles of the metallic powder 132 in the cold spray apparatus 120 are typically kept between about 20 degrees Celsius (68 degrees Fahrenheit) to about 1,000 degrees Celsius (1,832 degrees Fahrenheit). The temperature is selected to ensure the metallic powder material used stays in a solid state to allow proper deformation and bonding. The temperature and/or velocity can be adjusted to increase or decrease the gas velocity, as desired for the cold spray process, for example, to a sufficiently high velocity to propel the powder material at a velocity that can form a very dense deposit or to a sufficiently low velocity to propel the powder material at a velocity that can form a less dense deposit. Although most gases or fluids have the potential for sufficiently accelerating particles of metallic powder, the typical gases for a cold spray process include inert and semi-inert gases, for example, nitrogen and helium, although one skilled in the art may use alternate fluids to accelerate the particles. In one or more examples, the velocity of the metallic powder 132 can be influenced by the density of the gas selected in the cold spray process.

As illustrated in FIG. 8, in one or more examples, the cold spray apparatus 120 includes a gas source 210, a gas heater 212, a powder metering device 214, a nozzle 216, and a motion control device 208, for depositing the metallic powder 132 on the tool surface 122 of the mandrel 118 to form the metallic body 198 of the leading-edge structure 102, as shown generally in FIG. 9. In one or more examples, the cold spray apparatus 120 is configured to form the metallic body 198 of the leading-edge structure 102 in a layer-by-layer manner on the tool surface 122, as expressed above.

In one or more examples, a pressurized gas stream is fed from the gas source 210 to the gas heater 212, and then to the nozzle 216. The gas stream includes a gas 222, such as nitrogen, helium, other inert gases, and combinations thereof. The gas stream is fed from the gas source 210 at a suitable pressure (e.g., from about 300 psi to about 1,000 psi, such between about 400 psi and about 500 psi, such as about 450 psi). The gas heater 212 heats the gas stream to a suitable temperature (e.g., from about 500° F. (260° C.) to about 1900° F. (1038° C.) using any one of various conventional heating techniques before feeding the resulting heated gas stream to the nozzle 216, at the suitable pressure and temperature. In one or more examples, the metallic powder 132 is fed from the powder metering device 214 and is combined with the gas stream from the gas source 210 and fed to the nozzle 216. Particle sizes of the metallic powder 132 is selected influence (e.g., increase) deformation, which in turn, can result in better adhesion. A suitable powder feed rate of metallic powder 132 into the gas stream is used (e.g., from about 1 gm/minute to about 20 gm/minute. The powder feed rate can be used to increase or decrease the thickness of the deposit, as well as tailor the microstructure and mechanical properties of the deposit as desired. In one or more examples, the nozzle 216 is a conventional converging/diverging nozzle to accommodate the mixing of the gas 222 and the metallic powder 132. In one or more example, the heated first gas stream is introduced into the nozzle 216 at a first inlet and the metallic powder 132, propelled by a second gas stream, is introduced into the nozzle 216 at a second inlet, where the metallic powder 132 can be mixed, accelerated, heated by the gas 222. The dimensions of resulting deposit of the metallic powder 132 can vary. In one or more examples, a deposit has a thickness of about 1.0 mm to about 2.0 mm. In one or more examples, the cold spray apparatus 120 applies a plurality of layers of the deposit to build up metallic body 198 of the leading-edge structure 102 (FIG. 9) to a near net shape using the motion control device 208, such as a robotic arm, under computer control, to control the placement and orientation of deposits of the metallic powder 132. Additionally, the nozzle traverse speed controls the per pass layer thickness, for instance, a lower traverse speed results in an increase in deposit layer thickness and an increase in traverse speed results in a decrease in the deposit layer thickness, per pass. Generally, the net overall thickness is controlled by the number of passes. As an example, 0.003 inch to 0.01 inch per pass is suitable, with a net thickness of between approximately 0.01 inch to approximately 0.1 inch.

In one or more examples, the mandrel 118 is supported by a strongback 206. In one or more examples, the strongback 206 is coupled to a platform 220 that is configured to move the mandrel 118 relative to the cold spray apparatus 120. As an example, the platform 220 is configured to selectively rotate the strongback 206 and, thus, the mandrel 118 about a longitudinal axis of the mandrel 118 and/or relative to the cold spray apparatus 120. In one or more examples, the cold spray apparatus 120 is coupled to or includes the motion control device 208, such as a robotic arm, an overhead gantry, or other automated motion control device, that is configured to move the cold spray apparatus 120 relative to the mandrel 118, for example, along the longitudinal axis of the mandrel 118, while depositing the metallic powder 132 during the cold spray process.

In one or more examples, the mandrel 118 is designed and fabricated to enable ease in the release of the inner surface 124 from the tool surface 122 and, thus, facilitate uncomplicated removal of the metallic body 198 of the leading-edge structure 102, fabricated using the cold spray process, such as without the need or use of a release layer being situated between the tool surface 122 and the inner surface 124 (e.g., the inner layer 136) of the metallic body 198 of the leading-edge structure 102.

In one or more examples, the mandrel 118 is a monolithic structure. The mandrel 118 being a monolithic structure provides for the tool surface 122 that is continuous. The tool surface 122 being a continuous surface eliminates the possibility of the metallic powder 132 hitting, deforming, and bonding within a seam or discontinuity in the tool surface 122, which can impede release of leading-edge structure 102 from the mandrel 118. Also, fabricating the leading-edge structure 102 as a unitary, monolithic structure on the mandrel 118 using the cold spray process eliminates seam discontinuity when multiple tools and multiple deposits are combined to produce a net deposit. A seam in leading-edge protection weakens the structure and creates a significant flaw for resisting erosion and damage.

In one or more examples, the mandrel 118 includes or is made of a material that has a first hardness 140. As an example, the mandrel 118 can be fabricated using a hardened steel material. The particles of the metallic powder 132 include a second hardness 142. In one or more examples, the first hardness 140 is greater than the second hardness 142. For example, the first hardness 140 is sufficiently higher than the second hardness 142 such that the particles of the metallic powder 132 do not deform or erode the tool surface 122 when they hit. As such, the inner layer 136 of the metallic body 198 of the leading-edge structure 102, fabricated using the cold spray process, tends not to bond as strongly to the tool surface 122, thereby enabling release of leading-edge structure 102 from the mandrel 118.

In one or more examples, the cold spray apparatus 120 is selectively controlled to enable ease in the release of the inner surface 124 from the tool surface 122 and, thus, facilitate uncomplicated removal of the metallic body 198 of the leading-edge structure 102, fabricated using the cold spray process, such as without the need or use of a release layer being situated between the tool surface 122 and the inner surface 124 (e.g., the inner layer 136) of the metallic body 198 of the leading-edge structure 102.

In one or more examples, a velocity of the metallic powder 132 being sprayed or deposited on the tool surface 122 is selectively controlled and/or adjusted throughout the cold spray process such that at least the inner layer 136 of the metallic body 198 of the leading-edge structure 102, fabricated using the cold spray process, tends not to adhere or bond as strongly to the tool surface 122, thereby enabling easier release of leading-edge structure 102 from the mandrel 118. In one or more examples, at least the inner layer 136 and, optionally, one or more of the intermediate layers 224, are formed by depositing the metallic powder 132 at a velocity that is below (e.g., between approximately 5 percent and 25 percent below) an adhesion level of the metallic powder 132. After formation of the inner layer 136 and, optionally, one or more of the intermediate layers 224, the remainder of the intermediate layers 224 and the outer layer 138 are formed be depositing the metallic powder 132 at a velocity that is equal to or above the adhesion level of the metallic powder 132.

In one or more examples, adhesion or adhesion level of the metallic powder 132 refers to describes the permanent adhesion between cold spray and substrate, the temporary adhesion between cold spray and mandrel before release, and/or the adhesion level between particles and particle layers (e.g., cohesion) that translates to material strength, ductility, toughness, erosion resistance, etc.

In one or more examples, the particle size and/or particle shape of the metallic powder 132 is selected and/or controlled to influence adhesion. The particle size and/or particle shape of the metallic powder 132 are indirectly tied to impingement velocity based on their flow speed within the carrier gas. However, in other examples, the carrier gas is most directly used to control particle velocity, for example, by using a different gas density, changing gas temperature, and/or changing gas pressure.

In one or more examples, other process parameters can be selected, modified, and/or controlled to result in control of the adhesion level of the metallic powder 132. Examples of such parameters include the type of nozzle used with the cold spray apparatus 120, nozzle to mandrel/part surface distance (e.g., standoff distance), nozzle angle, nozzle geometry, nozzle motion, and/or control of a powder plume size and the resulting deposit.

In one or more examples, the leading-edge structure 102 includes or is made of a relatively lightweight and strong metallic material that is resistant to heat and wear using the cold spray apparatus 120. In one or more examples, the metallic body 198 of the leading-edge structure 102 is made of a single (e.g., one-constituent) metallic material 204. In one or more examples, the leading-edge structure 102 is made of Niobium 144 (e.g., Niobium 144 is the one-constituent metallic material 204). In one or more examples, the leading-edge structure 102 is made of another type of refractory metal 154, such as tungsten, molybdenum, tantalum, rhenium, and alloys or combinations thereof.

In other examples, the cold spray process uses a non-metallic powder. As an example, the powder material used by the cold spray apparatus 120 to fabricate the leading-edge structure 102 using the cold spray process is a ceramic powder. As an example, the powder material used by the cold spray apparatus 120 to fabricate the leading-edge structure 102 using the cold spray process is a ceramic-metal powder (referred to as cermet).

In one or more examples, the leading-edge structure 102 is fabricated from the metallic powder 132 using the cold spray process. In one or more examples, the metallic powder 132 is Niobium powder 134. In one or more examples, the metallic powder 132 is another suitable type of a refractory metal powder 150. The Niobium powder 134 provides a number of particular unique advantages over conventional cold spray powder materials. As an example, Niobium powder has a high melting temperature and is relatively soft, thereby facilitating better consolidation (e.g., deforming and bonding) through cold spray. After consolidation, Niobium parts have a relatively high toughness. Furthermore, use of the Niobium powder 134 as a single-constituent build material for fabricating the leading-edge structure 102 eliminates material incompatibility issues that can be common in cold spray manufacturing.

In one or more examples, Niobium 144 is a preferred material because of its ability to be formed into a consolidated deposit of layers that make up the metallic body 198 of the leading-edge structure 102. Niobium powder 134 is relatively soft and can be further refined using powder treatments, such as heat treatments (e.g., prior to cold spray) or adjusting particle shape and/or size distribution. Niobium cold spray forms dense deposits that are well consolidated with high cohesion between particles and deposit layers and with low porosity/inherent defects. Niobium can achieve thin or thick deposits to meet the airfoil leading edge protection needs. Once cold sprayed, Niobium provides for high erosion resistance, which few other materials are capable of achieving, including those that are substantially harder (e.g., titanium, nickel, steel, and the like and alloys thereof) due to the presence of defects, poor inter-particle, and inter-layer cohesion/adhesion, which results in low erosion resistance, rapid damage initiation, and propagation. Additionally, different particle spray methods are needed for very hard and/or ceramic-type particles, such as thermal spray. Higher hardness materials also provide for low strainability of the leading-edge protection system and strain mismatching at the bondline (or coupling) between the outer leading edge and inner structure. Also, low fatigue strength of the deposit, low to no yield strength, low ductility to failure, high erosion rates and rapid failure mechanisms. While softer materials may provide for high strains and strain matching, the deposit static and fatigue strength is lower, and the erosion performance falls below that of conventional material solutions.

The present disclosure recognizes that a distinction between a Niobium cold spray fabricated part versus a Niobium coating on a secondary metal substrate is that the Niobium cold spray fabricated part eliminates the need for tooling and fabrication of a secondary metal substrate, which is that much more difficult with complex geometries. Benefits of a Niobium cold spray fabricated part include avoiding fatigue strength debit of the substrate, residual stress distortions, adhesion limitations between coating and substrate. The present disclosure also recognizes that Niobium was not considered for use in stand-alone components because the traditional forms are too soft and not conducive to stand-alone components, such as the leading-edge protective structures disclosed herein. The use in powder form is traditionally sintered using powder metallurgy, and likewise the results are soft. Niobium has a very high melting point which makes fusing it very difficult, and the use of alloying elements and binders reduce its erosion properties and mechanical properties. Cold spray of coatings (and repairs) in general are also challenged by residual stresses, which appear to make parts, and especially relatively thin shelled parts, very difficult to make due to dimensional and shape distortions (largely due to the effect on the substrate). It's only after evaluating as-sprayed and post-heat treated properties apart from the substrate that the deposit can be properly evaluated for its properties and shape stability.

Referring generally to FIGS. 1-9 and particularly to FIG. 10, which schematically illustrates an example of the manufacturing environment 202 in which the system 100 fabricates the leading-edge structure 102 for the airfoil 104, such as the rotor blade 106, using the cold spray process. The following is a list of examples of the system 100, according to the present disclosure. Some of the elements, features, and/or components described in one example may be combined with other examples in various ways without the need to include other features described in those other examples, even though such combination or combinations are not explicitly described by example herein.

In one or more examples, the system 100 includes the mandrel 118. The mandrel 118 includes the tool surface 122. The system 100 includes the cold spray additive manufacturing apparatus 120. The cold spray additive manufacturing apparatus 120 is configured to deposit the metallic powder 132 on the tool surface 122 of the mandrel 118 to form the inner layer 136 of the leading-edge structure 102. The cold spray additive manufacturing apparatus 120 is configured to deposit the metallic powder 132 on the inner layer 136 to form the intermediate layers 224 of the leading-edge structure 102. The cold spray additive manufacturing apparatus 120 is configured to deposit the metallic powder 132 on the intermediate layers 224 to form the outer layer 138 of the leading-edge structure 102. The inner layer 136 forms the inner surface 124 of the leading-edge structure 102. The outer layer 138 forms the outer surface 126 of the leading-edge structure 102 that is opposite the inner surface 124. The intermediate layers 224 form the thickness of the leading-edge structure 102 between the inner surface 124 and the outer surface 126. The inner surface 124 of the leading-edge structure 102 is configured to be coupled to the airfoil 104 such that the outer surface 126 of the leading-edge structure 102 forms a portion of the leading edge 108 and a portion of the aerodynamic surface 152 of the airfoil 104. As expressed herein above, use of the mandrel 118 and the cold spray apparatus 120 provide a unique and advantageous means of fabricating a protector for leading edges of airfoils and rotor blades as compared to conventional techniques.

In one or more examples, the metallic powder 132 includes Niobium powder 134. In one or more examples, the metallic powder 132 consists essentially of Niobium powder 134. In one or more examples, the metallic powder 132 consists of Niobium powder 134. In one or more examples, the metallic powder 132 includes the refractory metal powder 150. As described herein above, use of Niobium powder 134, for example, as the primary or sole constituent material of the cold spray process for fabricating the leading-edge structure 102 provides unique advantages over conventional cold spray materials.

In one or more examples, the cold spray additive manufacturing apparatus 120 is configured to deposit the metallic powder 132 at a first velocity 146 to form at least the inner layer 136. The cold spray additive manufacturing apparatus 120 is configured to deposit the metallic powder 132 at a second velocity 148 to form one or more of the intermediate layers 224 and the outer layer 138. The first velocity 146 is less than the second velocity 148. As expressed herein above, selectively controlling a deposition velocity of the metallic powder 132 (e.g., the Niobium powder 134) at different points in the cold spray process enables easier separation of the leading-edge structure 102 from the mandrel 118 at completion of the fabrication process.

In one or more examples, the first velocity 146 is below the adhesion level of the metallic powder 132. In one or more examples, the second velocity 148 is equal to or above the adhesion level of the metallic powder 132. In one or more examples, the first velocity 146 is at least 5 percent less than the second velocity 148 or the adhesion level. In one or more examples, the first velocity 146 is at least 10 percent less than the second velocity 148 or the adhesion level. In one or more examples, the first velocity 146 is at least 15 percent less than the second velocity 148 or the adhesion level. In one or more examples, the first velocity 146 is at least 20 percent less than the second velocity 148 or the adhesion level. In one or more examples, the first velocity 146 is at least 25 percent less than the second velocity 148 or the adhesion level.

In one or more examples, the threshold for adhesion is considered 50% of particles adhere, and this velocity for a given material is called the critical velocity and is also a critical velocity ratio of "1". The critical velocity for niobium is 585 m/s. The upper end of the velocity scale is the start of substrate/mandrel erosion and is to be avoided. What's typical for a quality build, consolidated for strength and reduced defects, is about 1.5 or slightly higher. A lower percentage than the critical velocity will both decrease the number of particles that adhere and reduce the adhesion strength. For deposition on a hard surface, this is a variable that affects the velocity needed to adhere, driving it higher. What might work at 1.2 for a softer mandrel will disbond too readily for a harder mandrel. Somewhere between 1 and 1.5 critical velocity ratio is desired in the adhesion level to the mandrel. For example, at 1.4 a balance is achieved between adhering during the entirety of the build, while limiting the adhesion for ease of release. If lowered too much, the bond pass layer will prematurely disbond, and this can also happen after subsequent build layers are applied. Raise it too much and it increases the amount of force, or applied energy, required at the interface to separate. Mandrel geometry and net part thickness also influence the balance of adhesion, so it is part and tool design specific.

In one or more examples, the various layers of the metallic body 198 of the leading-edge structure 102 formed by the cold spray process can have different densities (e.g., deposit densities). As an example, the inner layer 136 includes a first density. One or more of the intermediate layers 224 includes a second density. The outer layer 138 includes a third density. In one or more examples, the first density, the second density, and the third density are different. In one or more examples, the second density is greater than the first density and the third density is greater than the second density. For example, the inner layer 136 is the least dense, each subsequent one of the intermediate layers 224 gets denser, and the outer layer 138 is the most dense. In one or more examples, the density of the deposit is related to the particle velocity as the ratio gets lower. In general, density can also be controlled by an impingement angle. For example, when spraying at low angles (e.g., below 45 deg), the voids should increase. Any adverse effect on surface quality be corrected and consolidated by a subsequent build layer.

In one or more examples, the various layers of the metallic body 198 of the leading-edge structure 102 formed by the cold spray process can have different surface areas (e.g., deposit surface areas). As an example, the inner layer 136 includes a first surface area. One or more of the intermediate layers 224 includes a second surface area. The outer layer 138 includes a third surface area. In one or more examples, the first surface area, the second surface area, and the third surface area are different. In one or more examples, the second surface area is less than the first surface area and the third surface area is less than the second surface area. For example, the inner layer 136 has the largest surface area, each subsequent one of the intermediate layers 224 gets smaller in surface area, and the outer layer 138 has the smallest surface area.

In one or more examples, the inner surface 124 of the leading-edge structure 102 is releasable from the tool surface 122 of the mandrel 118. In one or more examples, the mandrel 118 is a monolithic structure. The tool surface 122 is a continuous surface. In one or more examples, the mandrel 118 includes the first hardness 140. The metallic powder 132 includes the second hardness 142. The first hardness 140 is greater than the second hardness 142. As expressed herein above, selecting the material and/or surface characteristics of the mandrel 118 enables easier separation of the leading-edge structure 102 from the mandrel 118 at completion of the fabrication process.

Referring generally to FIGS. 1-9 and particularly to FIG. 10, which schematically illustrates an example of the leading-edge structure 102 for the airfoil 104, such as the rotor blade 106, fabricated using the cold spray process. The following is a list of examples of the leading-edge structure 102, according to the present disclosure. Some of the elements, features, and/or components described in one example may be combined with other examples in various ways without the need to include other features described in those other examples, even though such combination or combinations are not explicitly described by example herein.

In one or more examples, the leading-edge structure 102 includes the inner surface 124 that is configured to be coupled to the airfoil 104. The leading-edge structure 102 includes the outer surface 126 that is opposite the inner surface 124 and that is configured to form a portion of the leading edge 108 and a portion of the aerodynamic surface 152 of the airfoil 104. The leading-edge structure 102 is fabricated by depositing Niobium powder 134 on the tool surface 122 of the mandrel 118 using a cold spray additive manufacturing process.

In one or more examples, the leading-edge structure 102 is fabricated by depositing the Niobium powder 134 at the first velocity 146 to form at least the inner layer 136 on the tool surface 122 of the mandrel 118. The leading-edge structure 102 is further fabricated by depositing the Niobium powder 134 at the second velocity 148 to form one or more of the intermediate layers 224 on the inner layer 136 and the outer layer 138 on the intermediate layers 224. The first velocity 146 is less than the second velocity 148.

In one or more examples, the first velocity 146 is below the adhesion level of the metallic powder 132. The second velocity 148 is equal to or above the adhesion level of the metallic powder 132. In one or more examples, the first velocity 146 is at least 20 percent less than the second velocity 148 or the adhesion level.

Referring generally to FIGS. 1-9 and particularly to FIG. 10, which schematically illustrates an example of the airfoil 104, such as the rotor blade 106, that includes the leading-edge structure 102, fabricated using the cold spray process. The following is a list of examples of the airfoil 104, according to the present disclosure. Some of the elements, features, and/or components described in one example may be combined with other examples in various ways without the need to include other features described in those other examples, even though such combination or combinations are not explicitly described by example herein.

In one or more examples, the airfoil 104 includes the composite body 174. The composite body 174 includes the tip 114 and the root 116 that is opposite the tip 114. The composite body 174 includes the leading edge 108. The leading edge 108 includes the leading-edge first portion 128 that extends from the root 116 toward the tip 114. The composite body 174 includes the trailing edge 112 that is opposite the leading edge 108 and that extends from the root 116 to the tip 114. The airfoil 104 includes the leading-edge structure 102 that is coupled to the leading edge 108 of the composite body 174. The leading-edge structure 102 forms the leading-edge second portion 130 that extends from the leading-edge first portion 128 to the tip 114. The leading-edge structure 102 is fabricated by depositing Niobium powder 134 on the tool surface 122 of the mandrel 118 using a cold spray additive manufacturing process.

Figure 11:
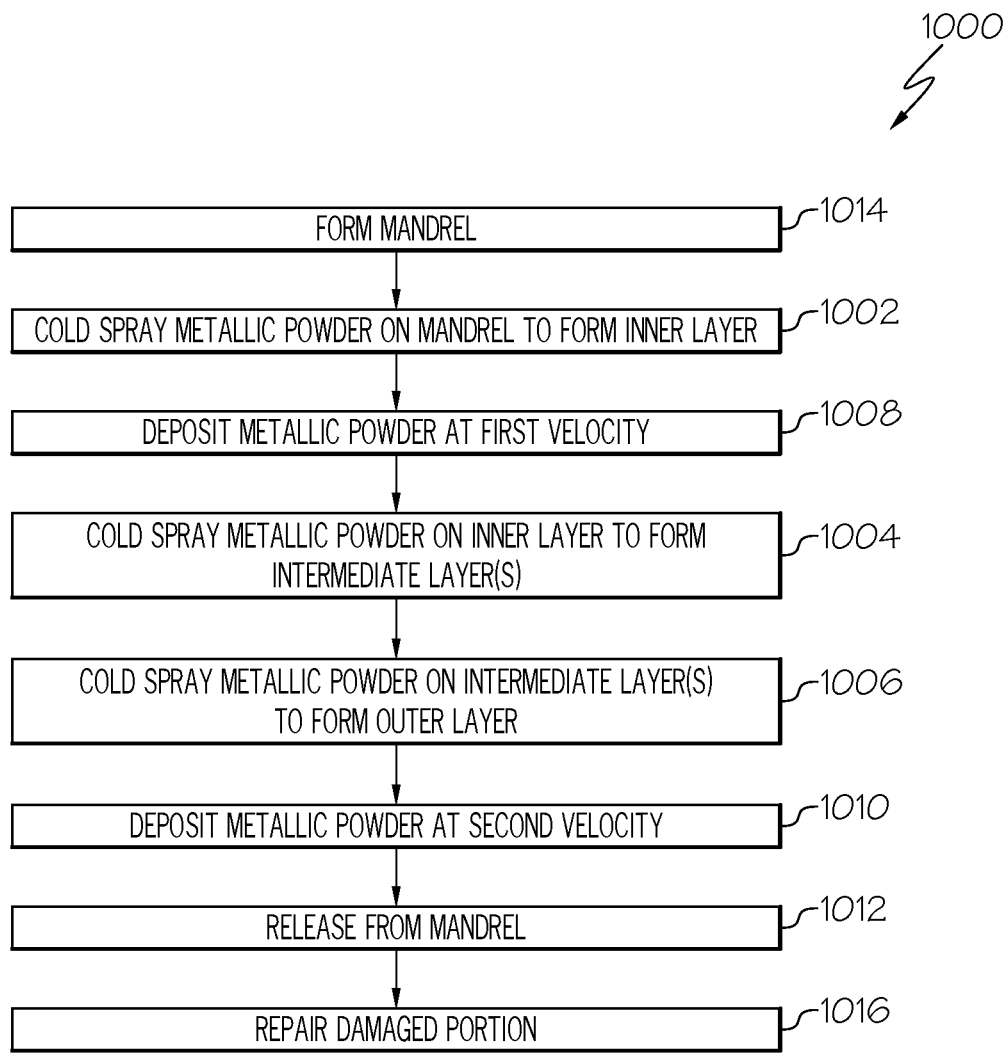
FIG. 11 is a flow diagram of an example of a method for fabricating a leading-edge structure using a cold spray process.

Referring generally to FIGS. 1-10 and particularly to FIG. 11, which illustrates an example of the method 1000 for fabricating the leading-edge structure 102 using the cold spray process. In one or more examples, the method 1000 is implemented using the system 100 (FIG. 10). The following is a list of examples of the method 1000, according to the present disclosure. Some of the elements, steps, and/or operations described in one example may be combined with other examples in various ways without the need to include other steps described in those other examples, even though such combination or combinations are not explicitly described by example herein.

In one or more examples, the method 1000 includes a step of (block 1002) cold spraying the metallic powder 132 (e.g., an initial portion or first portion of the metallic powder 132) on the tool surface 122 of the mandrel 118 to form the inner layer 136 of the leading-edge structure 102. The method 1000 includes a step of (block 1004) cold spraying the metallic powder 132 (e.g., subsequent portions or second portion of the metallic powder 132) on the inner layer 136 to form the intermediate layers 224 of the leading-edge structure 102. The method 1000 includes a step of (block 1006) cold spraying the metallic powder 132 (e.g., subsequent portions or third portion of the metallic powder 132) on the intermediate layers 224 (e.g., an outermost one of the intermediate layers 224) to form the outer layer 138 of the leading-edge structure 102. In these examples, the inner layer 136 forms the inner surface 124 of the leading-edge structure 102. The outer layer 138 forms the outer surface 126 of the leading-edge structure 102 that is opposite the inner surface 124. The intermediate layers 224 form the thickness of the leading-edge structure 102 between the inner surface 124 and the outer surface 126. The inner surface 124 of the leading-edge structure 102 is configured to be coupled to the airfoil 104 such that the outer surface 126 of the leading-edge structure 102 forms a portion of the leading edge 108 and a portion of the aerodynamic surface 152 of the airfoil 104.

In one or more examples, according to the method 1000, the metallic powder 132 includes Niobium powder 134. In one or more examples, according to the method 1000, the metallic powder 132 consists essentially of Niobium powder 134. In one or more examples, according to the method 1000, the metallic powder 132 consists of Niobium powder 134. In one or more examples, according to the method 1000, the metallic powder 132 includes the refractory metal powder 150.

In one or more examples, the method 1000 includes a step of (block 1008) depositing the metallic powder 132 (e.g., first portion of the metallic powder 132) at the first velocity 146 to form at least the inner layer 136. The method 1000 includes a step of (block 1010) depositing the metallic powder 132 (e.g., second portion of the metallic powder 132) at the second velocity 148 to form one or more of the intermediate layers 224 and the metallic powder 132 (e.g., third portion of the metallic powder 132) at the second velocity 148 to form the outer layer 138. In these examples, the first velocity 146 is less than the second velocity 148.

In one or more examples, according to the method 1000, the first velocity 146 is below the adhesion level of the metallic powder 132. The second velocity 148 is equal to or above the adhesion level of the metallic powder 132.

In one or more examples, according to the method 1000, the first velocity 146 is at least 5 percent less than the second velocity 148. In one or more examples, according to the method 1000, the first velocity 146 is at least 10 percent less than the second velocity 148. In one or more examples, according to the method 1000, the first velocity 146 is at least 15 percent less than the second velocity 148. In one or more examples, according to the method 1000, the first velocity 146 is at least 20 percent less than the second velocity 148. In one or more examples, according to the method 1000, the first velocity 146 is at least 25 percent less than the second velocity 148.

In one or more examples, the method 1000 includes a step of (block 1012) releasing the inner surface 124 of the leading-edge structure 102 from the tool surface 122 of the mandrel 118. Releasing the mandrel 118 can be performed without the need for intermediate release layers or melt layers.

In one or more examples, the leading-edge structure 102 can be subjected to post-fabrication heat treatment based on the material properties desired.

In one or more examples, the method 1000 includes a step of (block 1014) forming the mandrel 118. The mandrel 118 is formed (e.g., fabricated, manufactured, machined, etc.) such that the mandrel 118 is a monolithic structure and the tool surface 122 is a continuous surface.

In one or more examples, according to the method 1000, the mandrel 118 includes the first hardness 140. The metallic powder 132 includes the second hardness 142. The first hardness 140 is greater than the second hardness 142.

In one or more examples, the method 1000 includes a step of (block 1016) repairing a damaged portion 156 of the leading-edge structure 102 by depositing the metallic powder 132 on the outer surface 126 of the leading-edge structure 102 using the cold spray additive manufacturing process to repair the damaged portion 156 and to form a repaired portion 158 that has a shape that is at least approximately the same as the outer surface 126 as originally fabricated.

Figure 12:
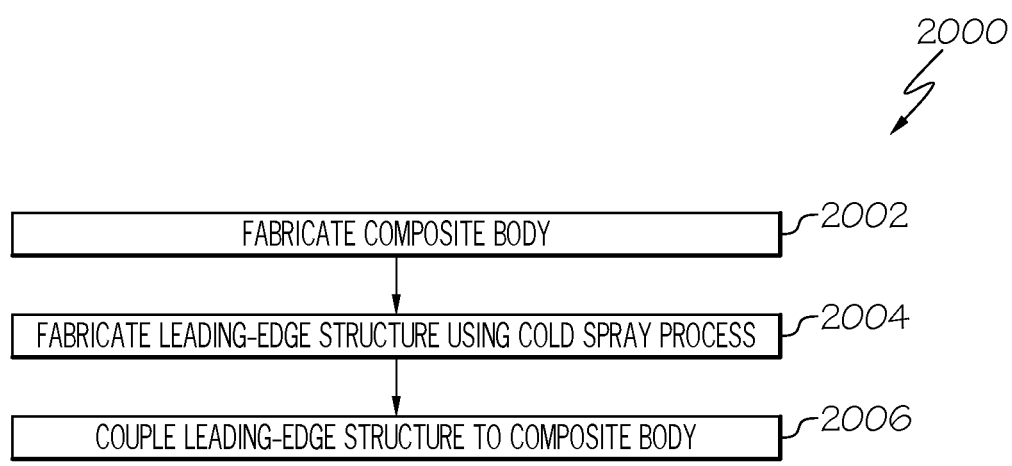
FIG. 12 is a flow diagram of an example of a method for manufacturing an airfoil having a leading-edge structure.

Referring generally to FIGS. 1-10 and particularly to FIG. 12, which illustrates an example of the method 2000 for manufacturing the airfoil 104. The following is a list of examples of the method 2000, according to the present disclosure. Some of the elements, steps, and/or operations described in one example may be combined with other examples in various ways without the need to include other steps described in those other examples, even though such combination or combinations are not explicitly described by example herein.

In one or more examples, the method 2000 includes a step of (block 2002) fabricating the composite body 174 of the airfoil 104. The composite body 174 includes the tip 114 and the root 116 that is opposite the tip 114. The composite body 174 includes the leading edge 108. The leading edge 108 includes the leading-edge first portion 128 that extends from the root 116 toward the tip 114. The composite body 174 includes the trailing edge 112 that is opposite the leading edge 108 and that extends from the root 116 to the tip 114. The method 2000 includes a step of (block 2004) fabricating the leading-edge structure 102 by depositing Niobium powder 134 on the tool surface 122 of the mandrel 118 using the cold spray additive manufacturing process. The method 2000 includes a step of (block 2006) coupling the leading-edge structure 102 to the leading edge 108 of the composite body 174 to form the leading-edge second portion 130 of the leading edge 108 that extends from the leading-edge first portion 128 to the tip 114.

Accordingly, the examples of system 100 and the method 1000 for fabricating the leading-edge structure 102 from the Niobium powder 134 using the cold spray process provides a number of unique advantages over conventional leading-edge protectors. As examples, use of the Niobium powder 134, the material hardness and surface characteristics of the mandrel 118, the operating parameters of the cold spray apparatus 120 throughout the cold spray process, or combinations thereof facilitate easier removal of the leading-edge structure 102 from the mandrel 118 after completing fabrication. For example, the leading-edge structure 102 can be separated and removed from the tool surface 122 of the mandrel 118 by applying energy, such as thermal and/or mechanical energy, to the leading-edge structure 102 and/or the mandrel 118. As another example, the cold spray process also enables fabrication of the leading-edge structure 102 having complex aerodynamic shapes. As yet another example, use of the Niobium powder 134 in the cold spray process reduces or eliminates internal stresses and strains that typically result in heat-based manufacturing techniques and does not degrade or alter the metallurgical properties of the leading-edge structure 102 during and after fabrication. As yet another example, the cold spray process enables the leading-edge structure 102 to be fabricated in near net shape, thereby reducing material input, material waste, and overall manufacturing time. Furthermore, by fabricating the leading-edge structure 102 on the mandrel 118 from the Niobium powder 134 using the cold spray process, the leading-edge structure 102 benefits from improved strength properties while still allowing a post-fabrication heat-treatment processes to further improve the material properties of the leading-edge structure 102.

Furthermore, examples of the leading-edge structure 102 include the inner surface 124 that advantageously defines the inner mold line of the leading-edge structure 102 resulting from fabrication using the system 100 and/or accord to the method 1000. The present disclosure recognizes that the thin release layers required by other cold spray manufacturing techniques is not negligible and introduces significant dimensional offset error for tooling surfaces and resulting part inner mold line surfaces of cold spray deposits for bonding. Additionally, release layers tend to introduce defects between the melt release layer and the cold spray deposit such as contamination or intermetallic alloys (e.g., zinc-niobium) causing undesirable mechanical properties, and rough surface texture from those mixing effects due to bonding requirements. Also, post-heat treatment of the cold spray deposit is challenged by the presence of the low-melting temperature release layer material or residual contaminants (e.g., inherent in the meltable release layer) that cannot be present in a high temperature vacuum furnace.

Figure 13:
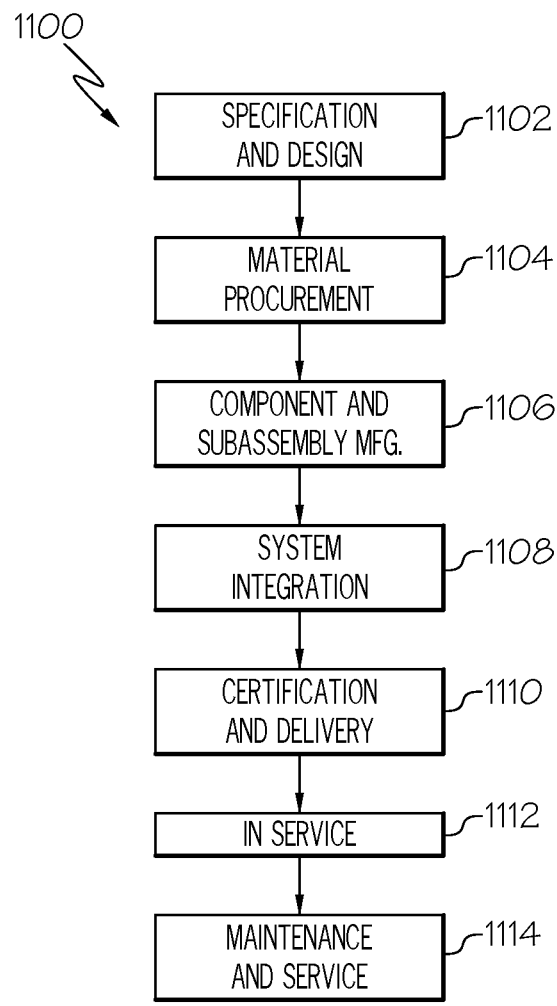
FIG. 13 is a flow diagram of an example of an aircraft manufacturing and service method.
Figure 14:
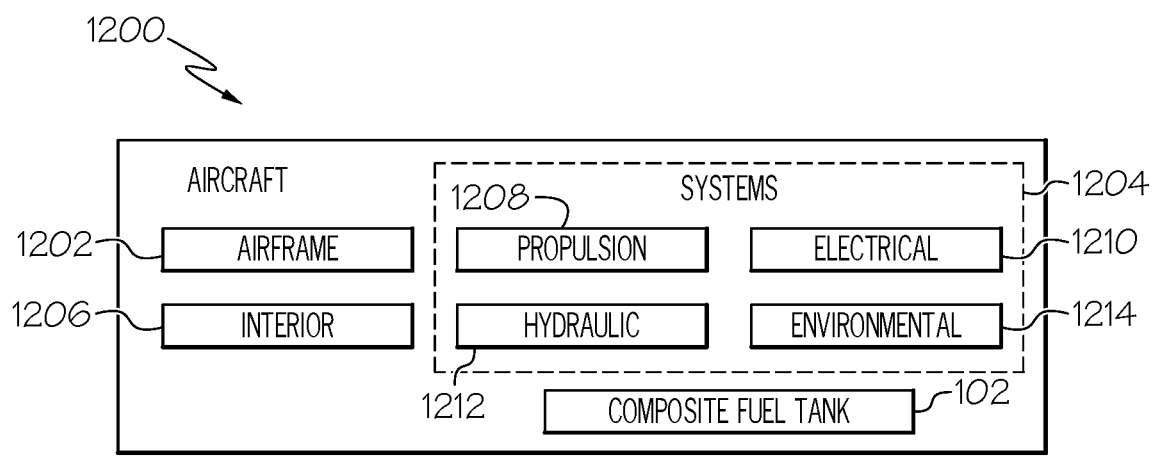
FIG. 14 is a schematic block diagram of an example of an aircraft.

Referring now to FIGS. 13 and 14, examples of the system 100, the method 1000, the leading-edge structure 102, the airfoil 104, and the method 2000 described herein, may be related to, or used in the context of, an aircraft manufacturing and service method 1100, as shown in the flow diagram of FIG. 13 and an aircraft 1200, as schematically illustrated in FIG. 14. As an example, the aircraft 1200 and/or the aircraft production and service method 1100 may include one or more airfoils 104, such as one or more rotor blades 106, propeller blades, fan blades, and the like that include the leading-edge structure 102, which is manufactured using the system 100 and/or according to the method 1000.

Referring to FIG. 14, which illustrates an example of the aircraft 1200. In one or more examples, the aircraft 1200 includes one or more of the airfoils 104 having the leading-edge structure 102. As examples, the aircraft 1200 is a rotorcraft that includes a plurality of the rotor blades 106, an airplane that includes plurality of propeller blades, or a jet plane that includes a plurality of fan blades. Generally, the aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208. The propulsion system 1208 includes one or more of the airfoils 104. Other examples of the onboard systems 1204 include hydraulic systems 1212, electrical systems 1210, and environmental systems 1214. In other examples, the onboard systems 1204 also includes one or more control systems coupled to an airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like.

Referring to FIG. 13, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 13 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, the leading-edge structure 102, the airfoil 104, and the method 2000, shown and described herein, may be employed during any one or more of the stages of the manufacturing and service method 1100 shown in the flow diagram illustrated by FIG. 13. In an example, fabricating the leading-edge structure 102 using the system 100 and/or according to the method 1000 and manufacturing the airfoil 104 having the leading-edge structure 102 according to the method 2000 may form a portion of component and subassembly manufacturing (block 1106) and/or system integration (block 1108). Further, fabricating the leading-edge structure 102 using the system 100 and/or according to the method 1000 and manufacturing the airfoil 104 having the leading-edge structure 102 according to the method 2000 may be implemented in a manner similar to components or subassemblies prepared while the aircraft 1200 is in service (block 1112). Also, fabricating the leading-edge structure 102 using the system 100 and/or according to the method 1000 and manufacturing the airfoil 104 having the leading-edge structure 102 according to the method 2000 may be utilized during system integration (block 1108) and certification and delivery (block 1110). Similarly, fabricating or repairing the leading-edge structure 102 using the system 100 and/or according to the method 1000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-10 and 14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-10 and 14, referred to above, need be included in every example and not all elements, features, and/or components described herein are necessarily depicted in each illustrative example. Accordingly, some of the elements, features, and/or components described and illustrated in FIGS. 1-10 and 14 may be combined in various ways without the need to include other features described and illustrated in FIGS. 1-10 and 14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-10 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-10 and 14, and such elements, features, and/or components may not be discussed in detail herein with reference to each of FIGS. 1-10 and 14. Similarly, all elements, features, and/or components may not be labeled in each of FIGS. 1-10 and 14, but reference numerals associated therewith may be utilized herein for consistency.

In FIGS. 11-13, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 11-13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, the leading-edge structure 102, the airfoil 104, and the method 2000 have been shown and described, modifications may occur to those skilled in the art upon reading the specification. The present application includes such modifications and is limited only by the scope of the claims.

What is claimed is:

1. A system for fabricating a leading-edge structure of an airfoil, the system comprising:
    a mandrel comprising a tool surface; and
    a cold spray additive manufacturing apparatus comprising a computer and programming that is configured to:
        deposit a metallic powder at a first velocity and at a first density on the tool surface of the mandrel to form an inner layer of the leading-edge structure;
        deposit the metallic powder at a second velocity, which is greater than the first velocity, and at a second density, which is greater than the first density, on the inner layer to form a number of intermediate layers of the leading-edge structure; and
        deposit the metallic powder at the second velocity and at a third density, which is greater than the second density, on one of the intermediate layers to form an outer layer of the leading-edge structure,
    wherein:
        the first velocity is below a level of permanent adhesion of the metallic powder to the tool surface of the mandrel;
        the second velocity is above a level of permanent adhesion of the metallic powder to the inner layer and any one of the intermediate layers;
        the inner layer forms an inner surface of the leading-edge structure;
        the outer layer forms an outer surface of the leading-edge structure that is opposite the inner surface;
        the intermediate layers form a thickness of the leading-edge structure between the inner surface and the outer surface; and
        the inner surface of the leading-edge structure is configured to be coupled to the airfoil such that the outer surface of the leading-edge structure forms a portion of a leading edge and a portion of an aerodynamic surface of the airfoil.

2. The system of claim 1, wherein the metallic powder comprises Niobium powder.

3. The system of claim 1, wherein the metallic powder comprises a refractory metal powder.

4. The system of claim 1, wherein the first velocity is between approximately 5 percent and approximately 25 percent less than the second velocity.

5. The system of claim 1, wherein:
    the mandrel is a monolithic structure; and
    the tool surface is a continuous surface.

6. The system of claim 1, wherein:
    the mandrel comprises a first hardness;
    the metallic powder comprises a second hardness; and
    the first hardness is greater than the second hardness.

7. The system of claim 1, wherein:
    the mandrel has a longitudinal axis; and
    the mandrel is configured for rotating about the longitudinal axis relative to the cold spray additive manufacturing apparatus during deposition of the metallic powder.

8. The system of claim 1, wherein the mandrel is rotatable about a longitudinal axis relative to the cold spray additive manufacturing apparatus.

9. A method for fabricating a leading-edge structure of an airfoil, the method comprising:
    cold spraying a metallic powder at a first velocity and at a first density on a tool surface of a mandrel to form an inner layer of the leading-edge structure;
    cold spraying the metallic powder at a second velocity, which is greater than the first velocity, and at a second density on the inner layer to form a number of intermediate layers of the leading-edge structure; and
    cold spraying the metallic powder at the second velocity and at a third density, which is greater than the second density, on one of the intermediate layers to form an outer layer of the leading-edge structure,
    wherein:
        the first velocity is below a level of permanent adhesion of the metallic powder to the tool surface of the mandrel:
        the second velocity is above a level of permanent adhesion of the metallic powder to the inner layer and any one of the intermediate layers:
        the inner layer forms an inner surface of the leading-edge structure;
        the outer layer forms an outer surface of the leading-edge structure that is opposite the inner surface;

the intermediate layers form a thickness of the leading-edge structure between the inner surface and the outer surface; and the inner surface of the leading-edge structure is configured to be coupled to the airfoil such that the outer surface of the leading-edge structure forms a portion of a leading edge and a portion of an aerodynamic surface of the airfoil.

10. The method of claim 9, wherein the metallic powder comprises Niobium powder.

11. The method of claim 9, wherein the metallic powder consists essentially of Niobium powder.

12. The method of claim 9, wherein the metallic powder consists of Niobium powder.

13. The method of claim 9, wherein the metallic powder comprises a refractory metal powder.

14. The method of claim 9, wherein the first velocity is between approximately 5 percent and approximately 25 percent less than the second velocity.

15. The method of claim 9, further comprising releasing the inner surface of the leading-edge structure from the tool surface of the mandrel,
wherein:
the mandrel is a monolithic structure;
the tool surface is a continuous surface;
the mandrel comprises a first hardness;
the metallic powder comprises a second hardness; and
the first hardness is greater than the second hardness.

16. The method of claim 9, further comprising rotating the mandrel about a longitudinal axis during cold spraying of the metallic powder.

17. The method of claim 9, further comprising releasing the inner surface of the leading-edge structure from the tool surface of the mandrel,
wherein:
the mandrel comprises a first hardness;
the metallic powder comprises a second hardness; and
the first hardness is greater than the second hardness.

18. A leading-edge structure of an airfoil comprising:
an inner surface that is configured to be coupled to the airfoil; and
an outer surface that is opposite the inner surface and that is configured to form a portion of a leading edge and a portion of an aerodynamic surface of the airfoil,
wherein:
the leading-edge structure is fabricated using a cold spray additive manufacturing process by:
cold spray depositing Niobium powder at a first velocity and at a first density to form an inner layer on a tool surface of a mandrel;
cold spray depositing the Niobium powder at a second velocity, which is greater than the first velocity, and at a second density, which is greater than the first density, to one or more intermediate layers on the inner layer; and
cold spray depositing the Niobium powder at the second velocity and at a third density, which is greater than the second density, to form an outer layer on the intermediate layers;
the first velocity is below a level of permanent adhesion of the Niobium powder to the tool surface of the mandrel; and
the second velocity is above a level of permanent adhesion of the Niobium powder to the inner layer and any one of the intermediate layers.

19. The leading-edge structure of claim 18, further comprising one of a dihedral shape, an anhedral shape, and a non-linear twist about a spanwise direction.

20. The leading-edge structure of claim 18, wherein the first velocity is between approximately 5 percent and approximately 25 percent less than the second velocity.

\* \* \* \* \*